United States Patent
Fan et al.

(10) Patent No.: US 10,437,214 B1
(45) Date of Patent: Oct. 8, 2019

(54) MULTI-AGENT DECISION MAKING SYSTEM FOR ECONOMIC OPERATION AND FREQUENCY REGULATION

(71) Applicants: Lingling Fan, Tampa, FL (US); Zhixin Miao, Tampa, FL (US)

(72) Inventors: Lingling Fan, Tampa, FL (US); Zhixin Miao, Tampa, FL (US)

(73) Assignee: University of South Florida, Tampa, FL (US)

( * ) Notice: Subject to any disclaimer, the term of this patent is extended or adjusted under 35 U.S.C. 154(b) by 275 days.

(21) Appl. No.: 15/369,146

(22) Filed: Dec. 5, 2016

Related U.S. Application Data

(60) Provisional application No. 62/263,212, filed on Dec. 4, 2015.

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
CPC ...... G05B 19/042; G05B 13/02; G05B 11/01; H02J 3/005; H02J 3/46; H02J 3/00; H03L 5/02; G06Q 50/06; G06F 17/17; G05F 1/66
USPC .......... 700/22, 286, 287, 288, 297; 705/412
See application file for complete search history.

(56) References Cited

U.S. PATENT DOCUMENTS

| | | | | |
|---|---|---|---|---|
| 7,359,878 B2 * | 4/2008 | Peljto | ..................... | G05B 19/00 705/37 |
| 8,126,685 B2 | 2/2012 | Nasle | | |
| 2014/0277599 A1 * | 9/2014 | Pande | ................... | G06Q 50/06 700/22 |
| 2015/0025696 A1 * | 1/2015 | Hug | ....................... | G06Q 50/06 700/286 |
| 2015/0039145 A1 * | 2/2015 | Yang | ........................ | H02J 3/00 700/291 |
| 2016/0077507 A1 * | 3/2016 | Sheble | ................... | G06Q 10/06 700/295 |

FOREIGN PATENT DOCUMENTS

| | | |
|---|---|---|
| CN | 103050983 | 4/2012 |
| CN | 103246207 | 8/2013 |

OTHER PUBLICATIONS

Kamwa, Robert Grondin, Yves Hebert "Wide-Area Measurement Based Stabilizing Control of Large Power Systems—a Decentralized/ Hierarchical Approach" at Power Systems, IEEE Transcations (vol. 16, Issue: 1), Feb. 2001, 18 pages.

(Continued)

*Primary Examiner* — Igor N Borissov
(74) *Attorney, Agent, or Firm* — Thomas Horstemeyer, LLP

(57) ABSTRACT

Disclosed are various embodiments that relate to multi-agent decision system based at least in part on a dual's dual problem formulation. The embodiments limited the amount of information exchanged among autonomous entities. The embodiments can incorporate existing AC optimal power flow (OPF) software systems. In one embodiments, a sub-gradient-based iterative method is used.

20 Claims, 19 Drawing Sheets

(56) References Cited

OTHER PUBLICATIONS

L. Chen, N. Li, S.H. Low, and J.C. Doyle, "Two Market Models for Demand Response in Power Networks," in Smart Grid Communications (SmartGridComm), 2010 First IEEE International Conference on IEEE, 2010, p. 397, 14 pages.

W. Zhang, W. Liu, X. Wang, L. Liu, and F. Ferrese, "Online Optimal Generation Control Based on Constrained Distributed Gradient Algorithm," 2014, 11 pages.

A.J. Conejo and J.A. Aguado, "Multi-Area Coordinated Decentralized DC Optimal Power Flow," Power Systems, IEEE Transactions on, vol. 13, No. 4, pp. 1272-1278, 1998.

A.G. Bakurtzis and P.N. Biskas, A Decentralized Solution to the DC-OPF of Interconnected Power Systems, IEEE Transactions on, vol. 18, No. 3, pp. 1007-1013, 2003.

P.N. Biskas, A.G. Bakirtzis, N.I. Macheras, and N.K. Pasialis, "A Decentralized Implementation of DC Optimal Power Flow on a Network of Computers," Power Systems, IEEE Transactions on, vol. 20, No. 1, pp. 25-33, 2005.

V.R. Disfani, L. Fan, and Z. Miao, "Distributed DC Optimal Power Flow for Radial Networks Through Partial Primal Dual Algorithm," in PES General Meeting—Conference & Exposition, 2015 IEEE. IEEE, 2015, pp. 1-5.

B.H. Kim and R. Baldick, "Coarse-grained distributed Optimal Power Flow," IEEE Transactions on Power Systems, vol. 12, No. 2, pp. 932-939, 1997.

"A Comparison of Distributed Optimal Power Flow Algorithms," Power Systems, IEEE Transactions on, vol. 15, No. 2, pp. 599-604, 2000.

T. Erseghe, "A Distributed and Scalable Processing Method Based upon ADMM," Signal Processing Letters, IEEE, vol. 19, No. 9, pp. 563-566, 2012.

E. Dall'Anese, H. Zhu, and G. B. Giannakis, "Distributed Optimal Power Flow for Smart Microgrids," Smart Grid, IEEE Transactions on, vol. 4, No. 3, pp. 1464-1475, 2013.

V.R. Disfani, L. Fan, L. Piyasinghe, and Z. Miao, "Multi-Agent Control of Community and Utility Using Lagrangian Relaxation Based Dual Decomposition," Electric Power Systems Research, vol. 110, pp. 45-54, 2014.

D.P. Palomar and M. Chiang, "A Tutorial on Decomposition Methods for Network Utility Maximization," Selected Areas in Communications, IEEE Journal on, vol. 24, No. 8, pp. 1439-1451, 2006.

A.G. Beccuti, T.H. Demiray, G. Andersson, and M. Morari, "A Lagrangian Decomposition Algorithm for Optimal Emergency Voltage Control," Power Systems, IEEE Transactions on, vol. 25, No. 4, pp. 1769-1779, 2010.

R. Hermans, M. Almassalkhi, and I. Hiskens, "Incentive-Based Coordinated Charging Control o Plug-in Electric Vehicles at the Distribution-Transformer Level," in American Control Conference (ACC), 2012, IEEE, 2012, pp. 264-269.

C. Zhao, U. Tpcu, and S. Low, "Swing Dynamics s Primal-Dual Algorithm for Optimal Load Control," in Smart Grid Communications (SmartGridComm), 201 IEEE Third International Conference on IEEE, 2012, pp. 2570-575.

C. Zhao, U. Topcu, N. Li, and S. Low, "Design and Stability of Load-Side Primary Frequency Control in Power Systems," Automatic Control, IEEE Transactions on. vol. 59, No. 5, pp. 1177-1189, May 2014.

T. Erseghe, "Distributed Optimal Power Flow Using Admm," Power Sysstems, IEEE Transactions on, vol. 29, No. 5, pp. 2370-2380, 2014.

Z. Miao and L Fan, "Primal-Dual Decomposition-Based Privacy-Preserving Decision Making Architectures for Economic Operation and Frequency Regulation," IEEE, 2016, 8 pages.

Z. Miao and L. Fan, "A Novel Multi-Agent Decision Making Architecture Based on Dual's Dual Problem Formulation," IEEE, 2016, 11 pages.

* cited by examiner

MULTI-AGENT DECISION MAKING SYSTEM FOR ECONOMIC OPERATION AND FREQUENCY REGULATION

CROSS REFERENCE TO RELATED APPLICATIONS

This application is a continuation of, and claims priority to, co-pending U.S. patent application entitled "PRIMAL-DUAL DECOMPOSITION-BASED MULTI-AGENT DECISION MAKING SYSTEMS FOR ECONOMIC OPERATION AND FREQUENCY REGULATION," filed on Dec. 4, 2015, and assigned application No. 62/263,212, which is incorporated herein by reference as if set forth herein in its entirety.

BACKGROUND

The introduction of numerous smart buildings, distributed energy sources, and energy storage systems poses challenges in operation and control. A centralized control center may over burden its SCADA system and computing machines by collecting every pertinent measurement and calibrating optimal operation schemes. On the other hand, due to privacy concerns, communities are not willing to share all of their information. Multi-agent decision making strategies become appealing for the above mentioned reasons.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
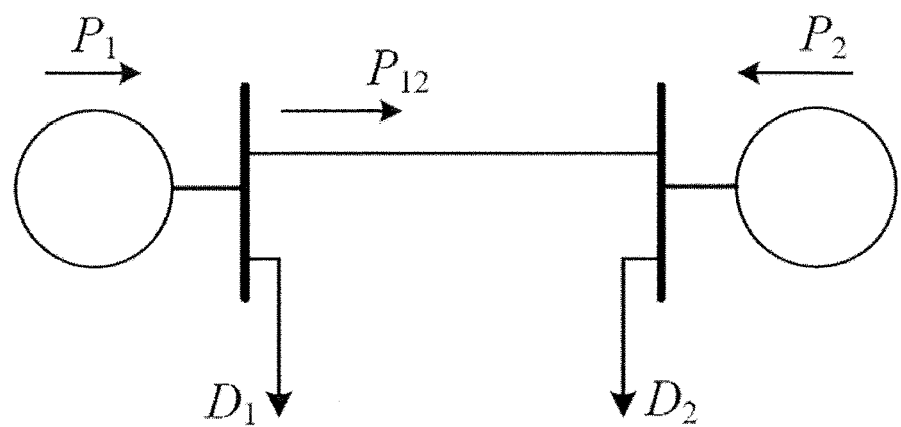
FIG. 1 illustrates a two area system, according to various embodiments of the present disclosure.

Disclosed herein are various embodiments related to multi-agent decision making systems and methods based on primal-dual decomposition-based distributed optimization that are designed for economic operation and frequency regulation. References will now be made in detail to the description of the embodiments as illustrated in the drawings.

Multi-agent decision making strategies have been seen in power system applications in literature, e.g., demand and utility interactions, economic dispatch, distributed direct current optimal power flow (DC-OPF), and distributed alternating current optimal power flow (AC-OPF). There are various names referring to this type of decision making architecture, including distributed control, decentralized control and multi-agent systems. The mathematic foundation of the strategies is distributed optimization. A variety of distributed optimization problem formulations and iterative procedures in solving distributed optimization problems can translate to a variety of information exchange topologies.

In terms of distributed problem formulation, two main approaches are primal decomposition and dual decomposition. In some embodiments, dual-based decomposition is suitable for optimization problems having decomposed cost functions and global constraints. Power system economic operation falls into this category. This technique has been applied in voltage control and electric vehicle control. In addition to Lagrangian relaxation-based dual decomposition, in some cases, another layer of relaxation can be imposed to have a dual's dual problem or a primal-dual problem. This formulation used to explain that a generator's droop control is aligned with primal-dual update process. The primal-dual formulation used to develop a new type of distributed DC OPF algorithm.

In terms of iterative procedures, popular approaches include subgradient-based updates and center free consensus-based updates. Subgradient-based strategies have many applications. The subgradient-based multi-agent control strategy has been used for utility-community interaction. A center-free consensus-based update is also seen in power system applications. For example, an economic dispatch problem is first converted to a consensus problem: prices at every area should be the same. Then each area will update its price based on the price information from the neighboring areas. The price update uses a weighting matrix (Markov stochastic matrix) to take into account the price information from other areas. With the converging property of a Markov matrix, the prices everywhere will be the same.

While information level decision making can be tested by software packages such as MATPOWER, there is a need to test decision making strategies in dynamic simulation platforms to examine their effect on power system frequency responses and dynamics. For multi-agent decision making, it is desired to have iterative procedures or "learning" by control agents as fast as possible. The discrete step of each iteration is desired to be as small as possible. There may be issues of coupling dynamics of the discrete decision and power system dynamics. Coupling dynamics between power market and power system could happen under certain circumstances. Therefore, through dynamic simulation, technical issues related to real-world implementation will be identified.

The various embodiments of the present disclosure relate to a category of multi-agent architectures based on a primal-dual problem formulation, investigating the converging properties, and implementing the architectures in dynamic simulation platforms.

Real-world implementation issues will be identified and countermeasures will be provided. There has been limited research in the area of distributed control and power system dynamic performance. Among the limited research, the distributed optimization-based generator control was implemented into a real-time digital simulation platform, where the generators' turbine-governor power references are updated every 0.1 seconds with additional frequency feedback. In the various embodiments of the present disclosure, this high sampling requirement on the communication system can be relaxed. For example, in some embodiments, the updating step can occur at 20 seconds intervals. In short, the various embodiments of the present disclosure contribute at least the following improvements to the field.

A new category of multi-agent decision making architectures based on the primal-dual problem is disclosed for implementation in power systems. Compared with the previous distributed optimization-based algorithms, the architectures allow even more discreet information exchange without any physical information exchange.

Convergence properties of the two types of strategies are investigated using numerical analysis convergence concepts and discrete dynamic system stability theories. Modifications are disclosed to enhance convergence.

Implementation of the decision making procedures in power system dynamic simulation facilitates dynamic stability examination when the system is equipped with discrete decision making. The dynamic simulation-based verification enhances the disclosed architectures' technical level readiness (TLR). Economic operation can be realized within 200 seconds for the demonstrated systems while providing frequency regulation.

Multi-agent Decision Making Architectures

First, a discussion of the optimization problem formulation is provided. Look at a two-area system as shown in FIG. 1. The original economic dispatch problem Prob1 is as follows.

$$Prob_1 \min_{P_1, P_2, P_{12}} f_1(P_1) + f_2(P_2) \quad (1a)$$

$$\text{subject to } \lambda_1 : P_1 - P_{12} = D_1 \quad (1b)$$

$$\lambda_2 : P_2 + P_{12} = D_2 \quad (1c)$$

$$-d \leq P_{12} \leq d \quad (1d)$$

where $P_i$ is the real power generated from Area i, $D_i$ is the load value (real power consumption), $f_i(P_i)$ is the cost function of a generator, and $P_{12}$ is the line flow from Area 1 to Area 2, and d is assumed to be the line limit. $\lambda_1$ and $\lambda_2$ are the Lagrangian multipliers corresponding to the two equality constraints. Their definitions are the same as the locational marginal price (LMP) at Bus 1 and 2. Here we assume that $\underline{P}_1 \leq \pm d + D_1 \leq \overline{P}_1$, and $\underline{P}_2 \leq \pm 5\ d + D_2 \leq \overline{P}_2$, i.e., the sums of line limits and loads are within the area capacity limits, or the generators will not hit limits before the line hits limit.

The dual problem Prob2 after relaxing the two equality constraints is as follows.

$$Prob_2 \max_{\lambda_1, \lambda_2} \min_{P_1, P_2, P_{12}} f_1(P_1) + \quad (2)$$
$$\lambda_1(D_1 - P_1 + P_{12}) + f_2(P_2) + \lambda_2(D_2 - P_2 - P_{12})$$
$$\text{subject to } -d \leq P_{12} \leq d$$

If we treat the line flow P12 separately from the generator power, then we have Prob3.

$$Prob_3 \min_{P_{12}} \max_{\lambda_1} \left( \min_{P_1}(f_1(P_1) - \lambda_1 P_1) + \lambda_1(D_1 + P_{12}) \right) + \quad 3)$$
$$\max_{\lambda_2} \left( \min_{P_2}(f_2(P_2) - \lambda_2 P_2) + \lambda_2(D_2 - P_{12}) \right)$$
$$\text{subject to } -d \leq P_{12} \leq d$$

The above formulation Prob3 is similar to the dual problem of the following optimization problem Prob4.

$$Prob_4 \max_{\lambda_1, \lambda_2} q_1(\lambda_1) + q_2(\lambda_2) \quad (4)$$

$$\text{subject to } \lambda_1 = \lambda_2$$

$$\text{where } q_1(\lambda_1) = \min_{P_1} (f_1(P_1) - \lambda_1 P_1) + \lambda_1 D_1$$

$$\text{and } q_2(\lambda_2) = \min_{P_2} (f_2(P_2) - \lambda_2 P_2) + \lambda_2 D_2.$$

The dual problem of Prob4 is notated as Prob5 and described in the following.

$$Prob_5 \min_{\pi} \max_{\lambda_1, \lambda_2} (q_1(\lambda_1) + q_2(\lambda_2) + \pi(\lambda_1 - \lambda_2))$$

Comparing Prob3 and Prob5, it is shown that the Lagrangian multiplier $\pi$ associated with $\lambda_1 = \lambda_2$ is indeed the tie-line flow $P_{12}$, if the line flow limit is not hit. Prob$_3$ is equivalent to the following optimization problem.

$$\min_{P_{12}} \begin{pmatrix} \min f_1(P_1) \\ \text{s.t. } P_1 - P_{12} = D_1 \end{pmatrix} + \begin{pmatrix} \min f_2(P_2) \\ \text{s.t. } P_2 + P_{12} = D_2 \end{pmatrix} \quad (5)$$

$$\text{subject to } -d \leq P_{12} \leq d$$

This problem has a strong economic meaning and application value. We can decompose a system that is connected by a tie-line by assuming a tie-line power flow. Each area will consider the tie-line flow injection or exporting as a negative (or positive) load. Each area carries out optimization and finds the LMP for the interfacing bus. At next iteration, the tie-line flow is updated based on the price difference of the sending end and receiving end buses. If the price at the sending end is higher than that at the receiving end, then the tie-line flow should be reduced. Otherwise, the tie-line flow should be increased.

As a non-limiting example for the two-area system in FIG. 1, assume that each area has two generators. Gen 1 and Gen 2 are in Area 1 while Gen 3 and Gen 4 are in Area 2. The cost functions of the four generators are 7Pg1, 8Pg2, 9Pg3, and 10Pg4. The power of each generator should be in the range of [0, 10] pu. The loads in two areas are 1 pu and 10 pu respectively. Line flow limit is ignored. For this example, both dual decomposition and dual's dual method are applied. For dual decomposition, each area solves a minimization problem for a given λk.

$$\min_{P_{g1}, P_{g2}} 7P_{g1} + 8P_{g2} + \lambda^k(D_1 - P_{g1} - P_{g2}) \quad (6)$$

$$\text{s.t. } 0 \leq P_{g1} \leq 10, \ 0 \leq P_{g2} \leq 10$$

$$\min_{P_{g3}, P_{g4}} 9P_{g3} + 10P_{g4} + \lambda^k(D_2 - P_{g3} - P_{g4}) \quad (7)$$

$$\text{s.t. } 0 \leq P_{g3} \leq 10, \ 0 \leq P_{g4} \leq 10$$

The dual variable updates based on the power imbalance:

$$\lambda^{k+1} = \lambda^k + \alpha_k(\Sigma D_i - \Sigma P_{gi}) \quad (8)$$

Figure 2:
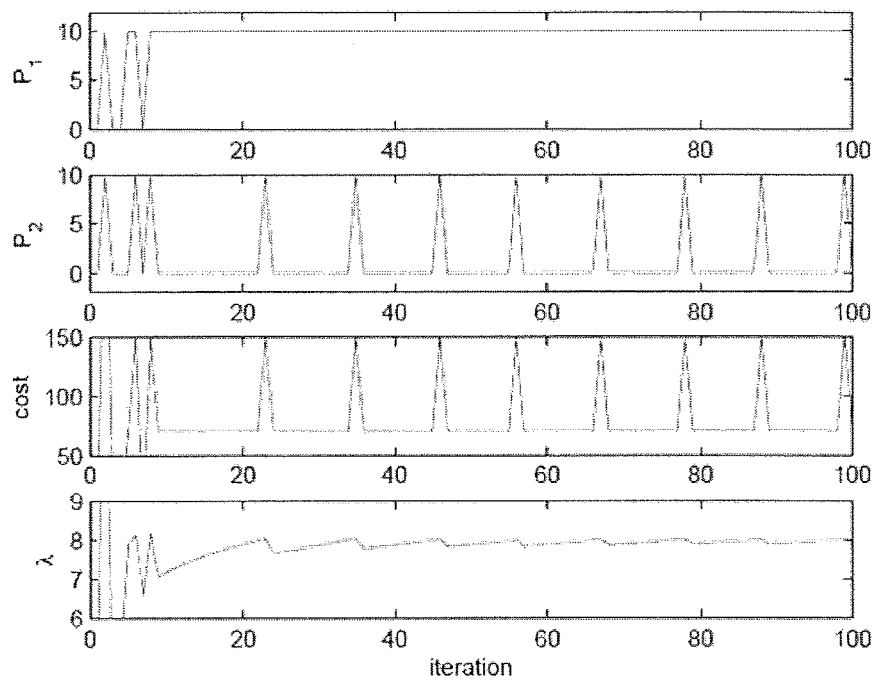
FIG. 2 illustrates a graph of dual decomposition method, according to various embodiments of the present disclosure.
Figure 3:
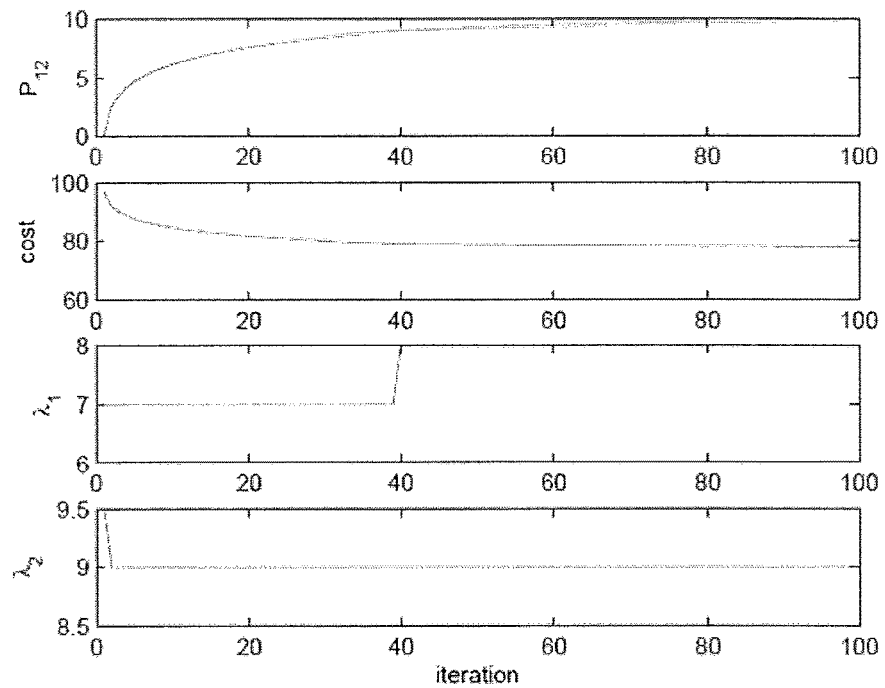
FIG. 3 illustrates a graph of dual's dual method, according to various embodiments of the present disclosure.

FIG. 2 gives the iterative results of dual decomposition method. FIG. 3 gives the iterative results of the dual's dual method. Note that the dual decomposition method fails to converge. The advantage of dual's dual method compared to the dual is listed as follows. For Prob$_1$, dual iteration method applies to the cases where the cost functions is strictly convex. When a generator's cost function is linear, dual method has difficulty converging and suffers switching oscillations. In order to improve convergence, augmented Lagrangian methods such as a method of multipliers and alternating direction method of multiplers (ADMM) have been considered. On the other hand, in the dual's dual method, the tie-line flow is updated based on the prices computed from each area. Even with linear cost functions or constant prices at all areas, tie-line flow will be able to reach its limit if the two prices are different or reach convergence if the two prices are the same.

As an extension, the application can be extended to consider AC OPF constraints inside each area. The only assumption that is different from a complete AC OPF is that the tie-line is assumed to be lossless. Therefore, using the proposed problem formulation, an approximate solution for AC OPF can be found.

Embodiments of the present disclosure can implement various information exchanges architectures. The dual's dual problem can be solved in iterative and decomposed ways. In some embodiments, the classic subgradient updating procedure is adopted for its simplicity. For the subgradient-based architecture, the tie-line flow is assumed and then updated based on its subgradient. In this case, we find a subgradient of the line flow (P12) is (λ1−λ2) from Prob3. Since the primal problem is a minimization problem, therefore, in the updating procedure, for a positive gradient, the line flow should be reduced. The updating procedure is presented as follows.

$$P_{12}^{k+1} = P_{12}^k - \alpha^k(\lambda_1^k - \lambda_2^k) \quad (9)$$

where $\alpha^k$ is a positive step size. For a given $P_{12}^k$, the LMPs ($\lambda_1^k$ and $\lambda_2^k$) can be found by solving individual optimization problem for each area. Equation (5) also complies with economy consideration. If Area 1 has a higher price, then Area 1's export should be reduced. If Area 2 has a higher price, then Area 1's export should be increased.

Figure 4:
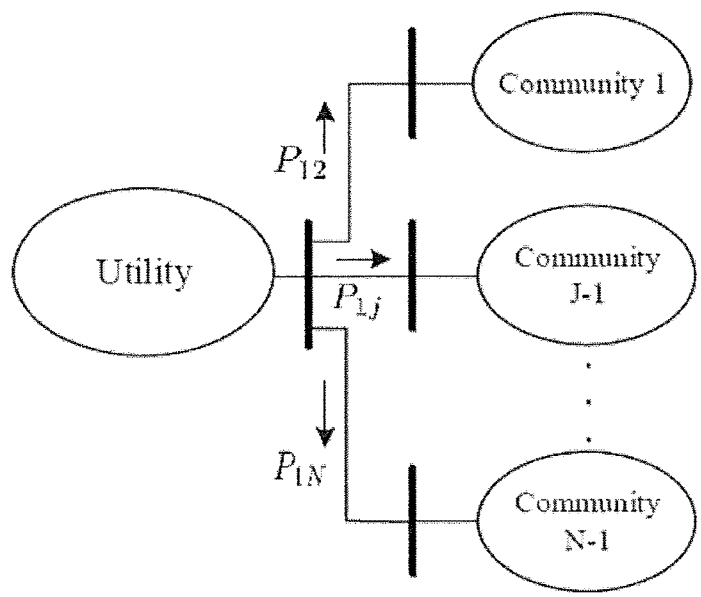
FIG. 4 illustrates a radial system, according to various embodiments of the present disclosure.
Figure 5:
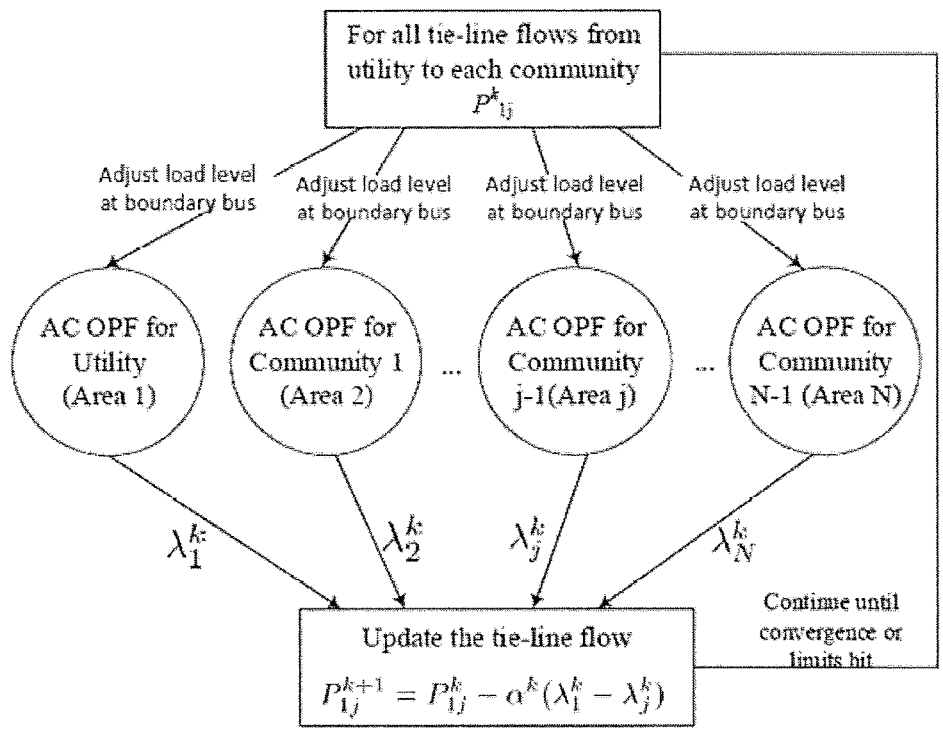
FIG. 5 illustrates a utility and community information exchange system that updates tie-line flow based on dual's dual method, according to various embodiments of the present disclosure.

In terms of information exchange, at every decision making step, Area 1 will broadcast P12k, Area 2 gets the information and finds its price λ2k, Area 2 then sends this information to Area 1, and Area 1 updates the tie-line power flow for the next step. This algorithm can be implemented in any radial network. For example, for a system in FIG. 4 where a utility is connected to multiple communities, the information exchange and updating strategy is demonstrated in FIG. 5.

First, all tie-line flows from the utility to communities are assumed. Then AC OPF is carried out for each entity (the utility or a community). The LMP at the boundary buses are collected by the utility to update the tie-line flows. This procedure will continue until the tie-line flows hit limit or converge to optimal values.

Figure 6:
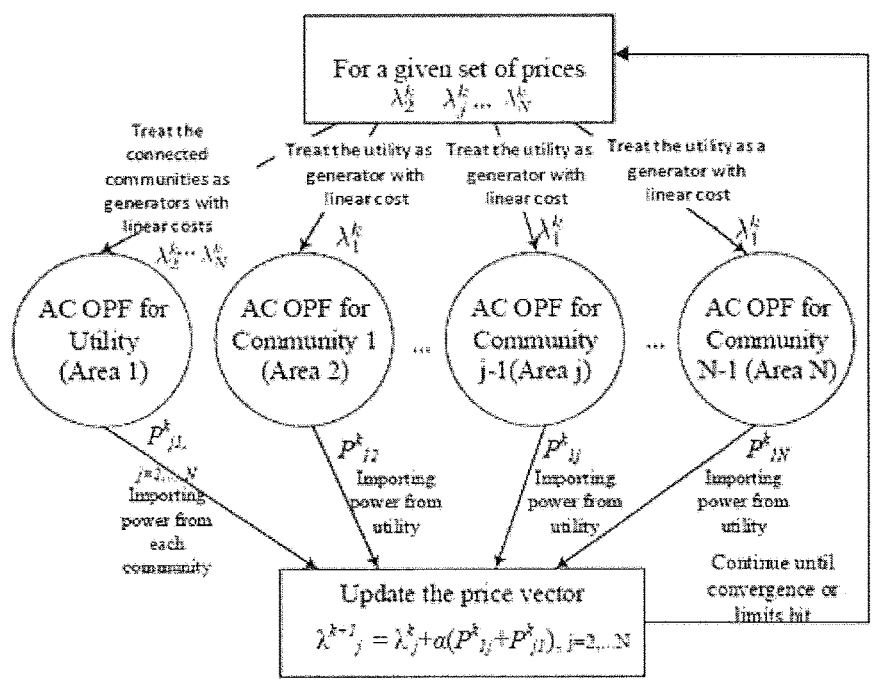
FIG. 6 illustrates a utility and community information exchange system that updates pricing based on dual's method, according to various embodiments of the present disclosure.

As a comparison, the information exchange strategy of Lagrangian dual variable updating based on the dual method is presented in FIG. 6. Although in both strategies, existing AC OPF solving packages are used, the price updating method requires additional manipulation in comparison to the tie-line flow updating method. In some embodiments, note that for the utility and each community, the connected entities have to be treated as generators with linear cost functions (or constant prices).

Next, the two-area system can be used to illustrate convergence criterion of the subgradient update. Assume that the step size α is a constant value. With regard to the subgradient (SG) method, the tie-line flow command from Bus 1 to Bus 2 is named as π. Hereafter, we use π instead of P12. This usage is to differentiate the tie-line flow command determined during the iteration process from the physical tie-line flow. At steady-state, these two (command and real value) are the same should the tie-line be lossless. However, considering power system internal dynamics related delays, during the dynamic period, these two are different. Based on π, the LMPs for the two buses can be found. The generator cost functions are assumed to be quadratic, that is:

$$f_1(P_1) = a_1P_1^2 + b_1P_1 + c_1, \quad (10)$$

$$f_2(P_2) = a_2P_2^2 + b_2P_2 + c_2, \quad (11)$$

When the capacity limits of generators and tie-lines are not hit, the prices should be the same as the marginal prices of the generators. Based on the price difference, the tie-line flow command is updated. The computation and updating at k-th step can be represented by (12). Here the assumption that $\underline{P}_1 \leq \pm d + D_1 <= \overline{P}_1$, and $\underline{P}_2 \leq \pm d + D_2 <= \overline{P}_2$ hold, i.e., the generators will not hit the limits before the line hits limit. Therefore, the prices will not hit the limit during the updating procedure if the line limit is considered.

$$\lambda_1^k = \lambda_{10} + 2a_1 \pi^k \quad (12)$$

$$\lambda_2^k = \lambda_{20} - 2a_2 \pi^k$$

$$\pi^{k+1} = \begin{cases} d, & \text{if } \pi^k - \alpha(\lambda_1^k - \lambda_2^k) >= d \\ -d, & \text{if } \pi^k - \alpha(\lambda_1^k - \lambda_2^k) \leq -d \\ \pi^k - \alpha(\lambda_1^k - \lambda_2^k), & \text{otherwise} \end{cases}$$

where $\alpha > 0$ and $$\lambda_{10} = 2a_1 D1 + b_1; \lambda_{20} = 2a_2 D_2 + b_2 \quad (13)$$

The price updating scheme shows that once the maximum limits $\overline{\lambda}_i$, are hit, the price should stay at its maximum due to the generator capacity limits. Also, if Area 1 is hitting its maximum limit, or Area 2 is hitting its minimum capacity limits, the tie-line flow from Area 1 to 2 should be kept at its maximum d. On the other hand, if Area 2 is hitting its maximum capacity limit or Area 1 is hitting its minimum capacity limits, the tie-line flow from Area 1 to 2 should be kept at its minimum −d.

Once the tie-line flow hits a limit, the iteration procedure can decide if it should end or continue. For example, if the upper limit of the tie-line from Area 1 to Area 2 is hit, however, λ1>λ2, the iteration should continue and the tie-line flow will be reduced. Otherwise, stop. This implies that when the tie-line flow is hitting the upper limit, LMP at Area 2 should be greater than LMP at Area 1. The starting point of the tie-line flow, of course, should be within the feasible region.

if $\pi^k = d$, $\text{sign}(\lambda_1^k - \lambda_2^k) < 0$, stop.
if $\pi^k = -d$, $\text{sign}(\lambda_1^k - \lambda_2^k) < 0$ stop.

Otherwise, it continues. Except the limit hitting scenarios, the iteration of the tie-line flow command can be found:

$$\pi^{k+1} = \pi^k - \alpha[\lambda_{10} - \lambda_{20} + 2(a_1 + a_2)\pi^k] \quad (14)$$
$$= (1 - 2(a_1 + a_2)\alpha)\pi^k - \alpha(\lambda_{10} - \lambda_{20}).$$

Convergence property of the above equation (14) can be both addressed by the convergence condition of an iterative procedure or discrete dynamic system stability criterion. In numerical analysis, to guarantee that the error to the true value is decreasing, the condition for an iteration procedure expressed by $x = \phi(x)$ is that the derivative of $\phi(x)$ at the true value should be less than 1. In linear discrete control systems, the eigenvalues of the system matrix should be within the unit circle. Both indicate that for the above mentioned SG-based iteration, for $\pi$ to converge to an optimal solution, the following condition should be met:

$$|1 - 2(a_1 + a_2)\alpha| < 1 \quad (15)$$

Therefore, a small $$\alpha\left(\alpha < \frac{1}{a_1 + a_2}\right)$$

means a converging procedure. When $$\alpha = \frac{1}{2(a_1 + a_2)},$$

$$\pi^{k+1} = -\alpha(\lambda_{10} - \lambda_{20}) = -\frac{\lambda_{10} - \lambda_{20}}{2(a_1 + a_2)} \quad (16)$$
$$= \frac{-2a_1 D_1 - b_1 + 2a_2 D_2 + b_2}{2(a_1 + a_2)}.$$

The above equation shows that if $\alpha$ is chosen to be $$\frac{1}{2(a_1 + a_2)},$$

the convergence will be realized in one step. If the generator cost functions are the same ($a_1 = a_2$, $b_1 = b_2$), then each generator will generate the same amount of power $$\frac{D_1 + D_2}{2}$$

and the tie-line flow will $$\frac{D_2 - D_1}{2}.$$

Based on the above equation, the same answer can be found.

Figure 7:
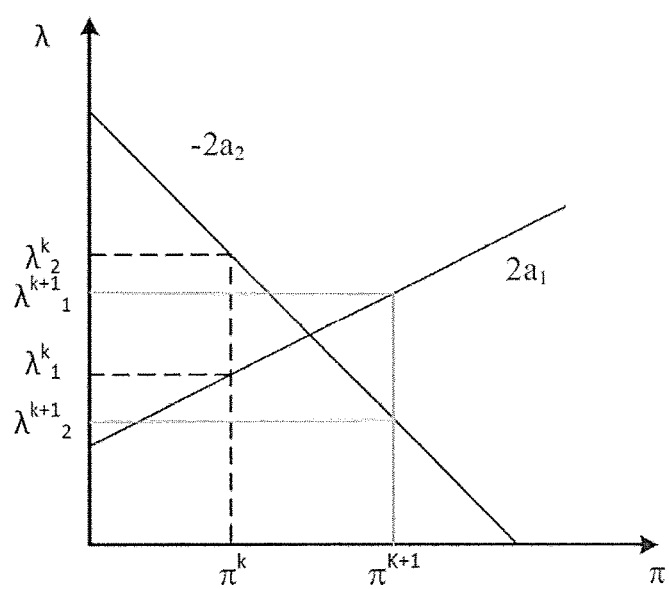
FIG. 7 illustrates a graph of a subgradient method that will cause oscillations, according to various embodiments of the present disclosure.

FIG. 7 illustrates the subgradient method with the extreme case of $$\alpha = \frac{1}{\alpha_1 + \alpha_2}$$

and $\lambda_1^k = \lambda_1^{k+1} - \lambda_2^{k+1}$, which causes oscillations. For a non-constrained convex optimization problem to minimize f(x), where f: $\mathbb{R}^n \to \mathbb{R}$, the subgradient method update is given by $$x^{(k+1)} = x^{(k)} - \alpha_k g^{(k)},$$

where $\alpha_k > 0$ and $g^{(k)}$ is any subgradient off at $x^{(k)}$. The subgradient algorithm is guaranteed to converge within some range of the optimal value:

$$\lim_{k \to \infty} f_{best}^{(f)} - f^* < \epsilon,$$

where f* is the optimal value of the problem, i.e., $f^* = \min_x f(x)$. $\epsilon$ is a function of the step size $\alpha_k$. When $\alpha_k$ is a constant step size, the value $f^{(k)}$ converges to a ball with a radius of $\epsilon$.

For diminishing step size (i.e., $\alpha k \to 0$, where $k \to \infty$), the algorithm converges to the optimal value since $\epsilon$ goes to zero when $\alpha k$ reduces to zero, i.e., $\lim k \to \infty f(k) = f^*$.

The above convergence property is related to the value of the optimization problem or f(x). In the various embodiments of the present disclosure, convergence discussion is related to $\pi$, which is the decision variable (we can view $\pi$ as x in the general problem). For a diminishing step size ($\alpha k \to 0$ when $k \to \infty$), we can be sure that $\pi k$ will converge to a point based on the following updating rule $$\pi^{(k+1)} = \pi^{(k)} - \alpha_k g^{(k)},$$

If the step size $\alpha k$ is a constant value, convergence of $\pi$ to an optimal point requires that the subgradient g becomes zero. There is no guarantee for f k to reach the optimal value when $k \to \infty$ for a constant step size. Therefore, convergence of $\pi k$ to $\pi^*$ is not guaranteed for a general problem.

In some embodiments, the convergence analysis of $\pi k$ is conducted for this specific problem with quadratic cost functions. It has been found that $\pi k$ converges to $\pi^*$ even with a constant step size. Limits of the step size are identified to have a convergence property.

Dynamic Simulation Platform Implementation and Frequency Response Demonstration

The discrete decision making architectures will be implemented into a dynamic simulation platform to examine their impact on the system frequency response. Power System Toolbox was selected as the dynamic simulation platform. The classical two-area four-machine power system is modified slightly to have shortened tie-lines and well-damped electromechanical dynamics. Generators are modeled as classical generators with turbine-governor blocks. Primary frequency droops with the regulation constant at 5% are all included.

Figure 8:
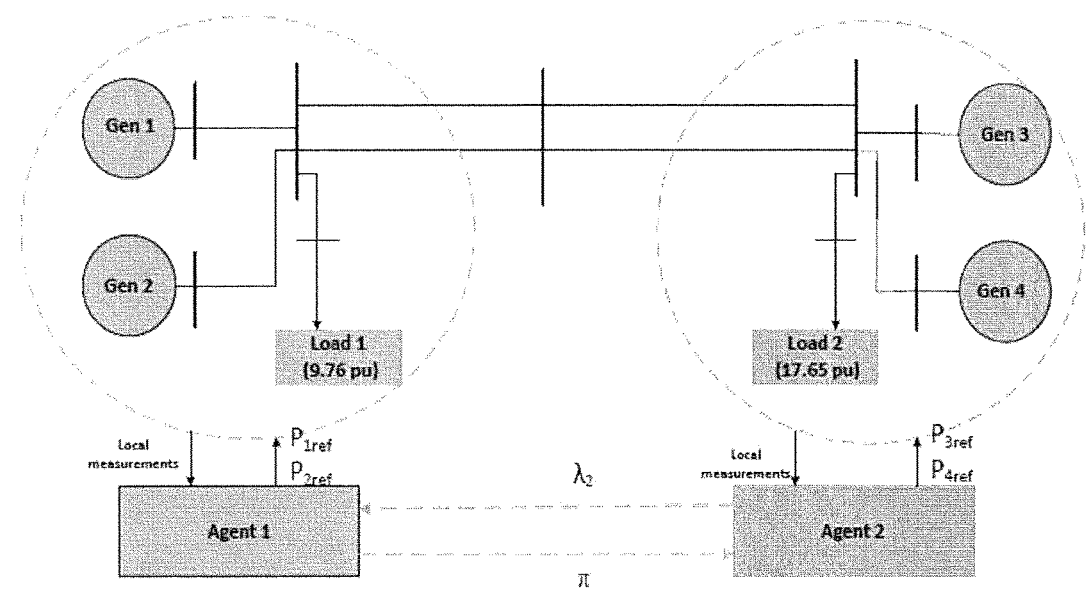
FIG. 8 illustrates an example of a two-area system, according to various embodiments of the present disclosure.

The power system and its multi-agent decision making architecture are shown in FIG. 8. In one embodiment, the discrete decision making will take place every 20 seconds. The power commands from Agent 1 and Agent 2 will be sent to change the turbine-governors' power reference inputs. Among the two agents, the information exchange includes the virtual tie-line power flow and the price signal. Area 1 comprises Gen 1, Gen 2, and Load 1. Area 2 comprises Gen 3, Gen 4, and Load 2. The two areas are connected through tie-lines. Initially, the four generators are dispatched at 7.0207 pu, 7.00 pu, 7.16 pu and 7.00 pu. Assume that in Area 1 the two generators are having the same quadratic cost functions: 4P21, 4P22 and in Area 2 the two generators also have the same quadratic cost functions P23 and P24. The total load is 27.41 pu. If the tie-line transfer limit is very high, then the LMPs at two areas are the same when tie-line power loss is ignored. In addition, if the generators' limits are ignored, then LMP equals marginal cost of each generator.

Initially the four generators' dispatch levels are similar. After the decision making procedures, Area 2's generators will have higher dispatch levels as Gen 3 and Gen 4 are much cheaper than Gen 1 and Gen 2.

A. Example 1: SG-Based Update

Primal-dual-based decision architecture will be implemented. In one embodiment, at every 20 seconds, Area 1 will send Area 2 the virtual tie-line flow and Area 2 sends Area 1 its LMP $\lambda 2$. The two areas also compute LMPs and dispatch patterns based on the virtual tie-line flow $\pi$.

When implemented into dynamic simulation, the discrete change for every step should not be too large. This can be achieved by selecting a varying $\alpha$ in the $\pi$ updating procedure. In the first few steps, $\alpha$ should be small and $\alpha$ can be increased when the price difference becomes smaller.

Figure 9:
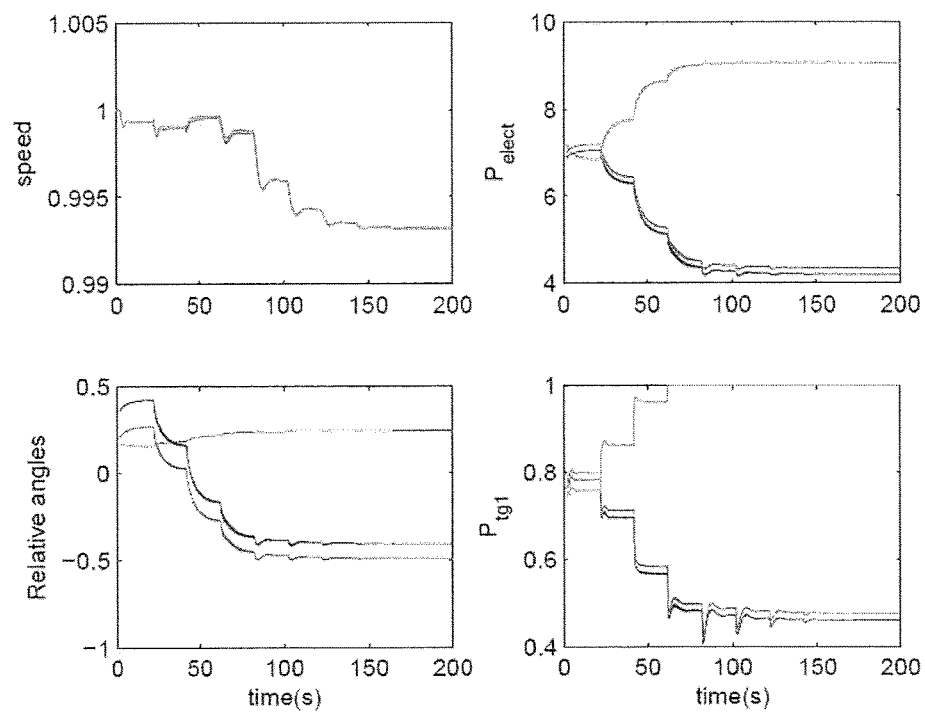
FIG. 9 illustrates graphs of system dynamic responses, according to various embodiments of the present disclosure.

The dynamic responses of the system are presented in FIG. 9, which shows that within 200 seconds, the system achieves a new steady-state. The power dispatch levels of the generators are all changed to new levels.

Figure 10:
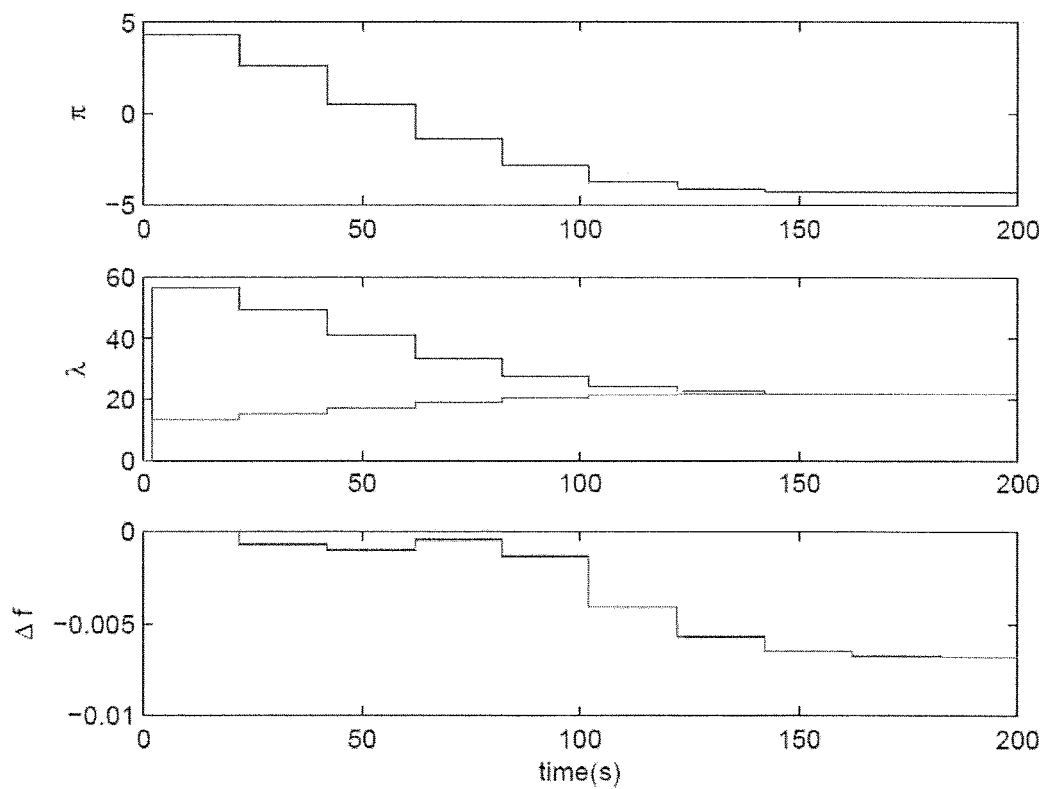
FIG. 10 illustrates graphs of the Lagrangian multipliers, according to various embodiments of the present disclosure.

The discrete decision variables are also recorded for every simulation step and presented in FIG. 10. It can be found that for less than 10 steps, both $\pi$ and LMPs converge to constant values. However, the system has a frequency deviation of −0.007 pu. This is due to the assumption of lossless line in developing the decision making strategy. The power dispatched by the generators only takes care of loads. The total generation is less than the total consumption including loads and tie-line power loss. Therefore, the steady-state frequency is below the nominal frequency.

B. Example 2: LUBS-Based Update

The Type-b architecture was tested in dynamic simulation as well. Agent 1 determines dispatch level and price based on a virtual tie-line flow $\pi$. Agent 1 also sends the price information to Agent 2. Agent 2 then decides dispatch level and the tie-line flow $\pi$, which is sent back to Agent 1.

Figure 11:
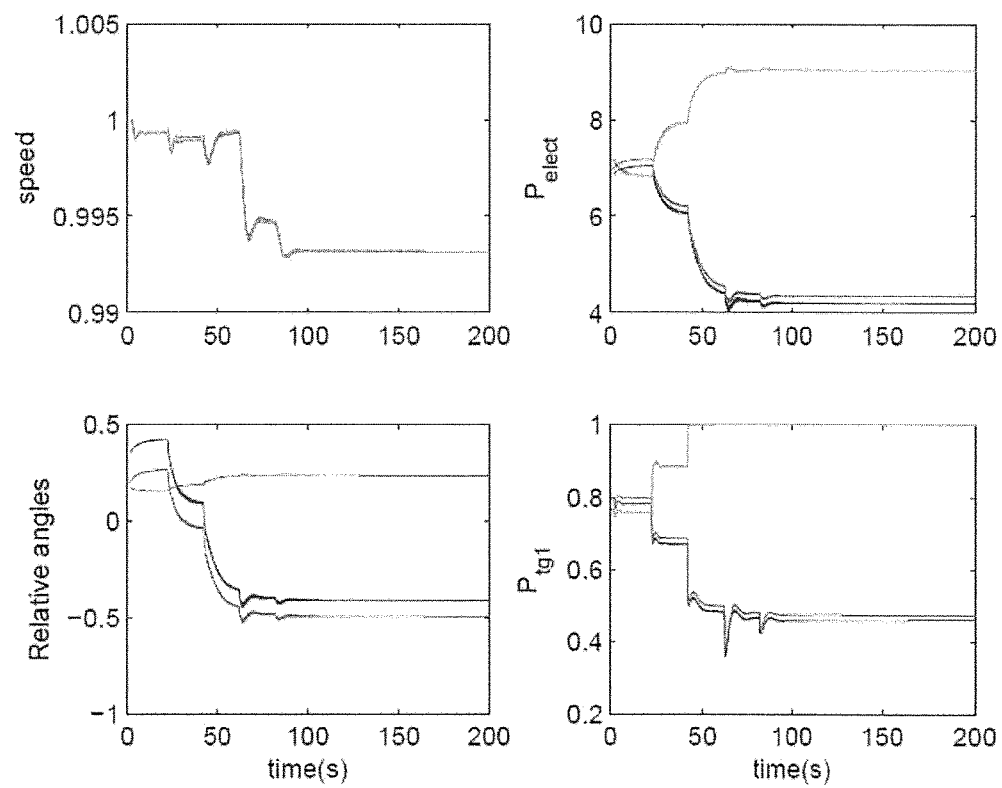
FIG. 11 illustrates graphs of system dynamic responses, according to various embodiments of the present disclosure.

The system dynamic responses are presented in FIG. 11. It can be observed that within 200 seconds, a new steady-state is achieved. The frequency is below the nominal.

Figure 12:
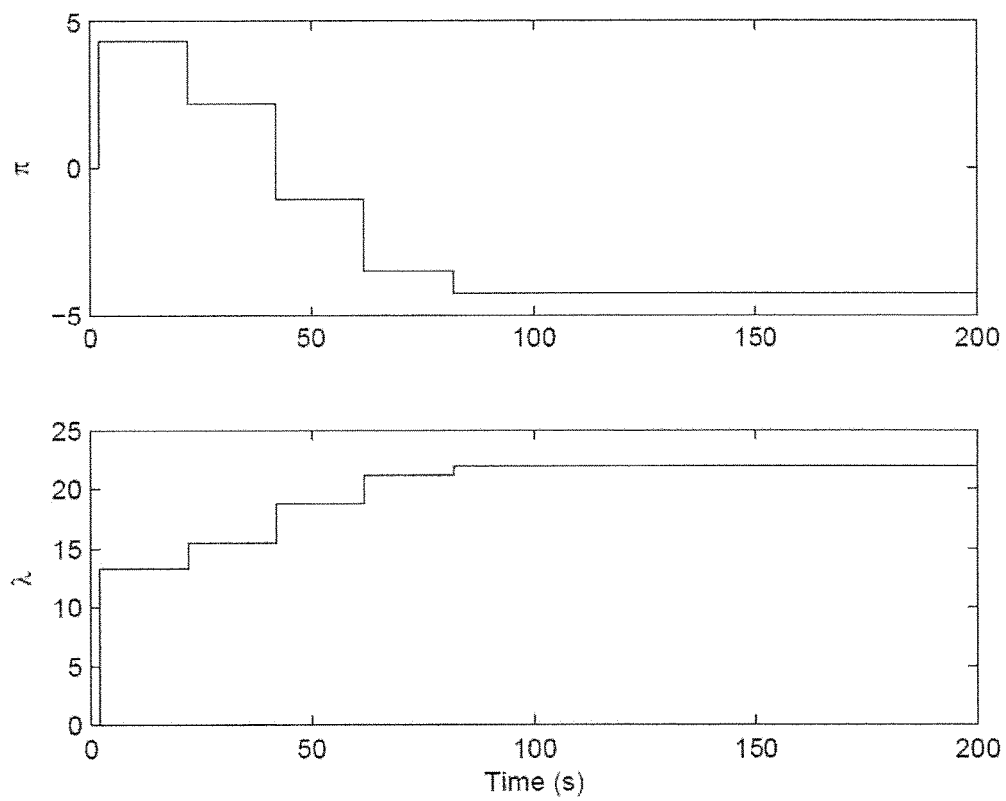
FIG. 12 illustrates graphs of the Lagrangian multipliers, according to various embodiments of the present disclosure.

The decision variables are presented in FIG. 12. It can be observed that convergence can be reached in five steps.

C. Remarks and Countermeasures to Improve the Frequency Regulation

In this subsection, reduction of the frequency deviation is discussed. The proposed decision making strategies have the assumption of lossless tie-line. Therefore, the power dispatched by the generators only takes care of loads. The total generation is less than the total consumption including loads and tie-line power loss. Therefore, in the previous two examples, the steady-state frequency is below the nominal frequency.

To compensate for the frequency deviation, the strategies can be modified to have the price calculation having an additional component that can reflect the power unbalance or energy unbalance. The energy unbalance is proportional to the system's average frequency deviation. Therefore, at each step, the LMPs computation become as follows.

$$\lambda_1^k = 2a_1 \frac{\pi^k + \overline{D}_1}{2} + b_1 - K_1 \Delta \omega_1 \tag{17}$$

$$\lambda_2^k = 2a_2 \frac{-\pi^k + \overline{D}_2}{2} + b_2 - K_2 \Delta \omega_3 \tag{18}$$

If the system's frequency is below the nominal frequency, the prices will be increased. In turn, the generators will increase their dispatch. Note the frequency measurements are obtained every 20 seconds. The effect of such feedback on system dynamic performance is demonstrated in the FIG. 13 and FIG. 14.

Figure 13:
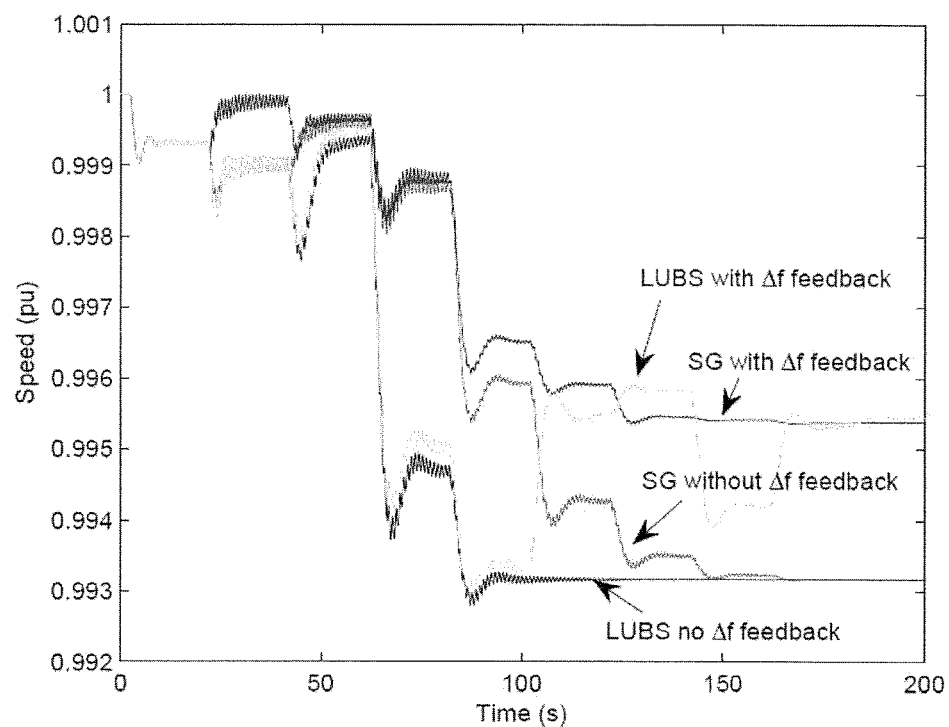
FIG. 13 illustrates graphs of comparisons of the rotating speed of a generator, according to various embodiments of the present disclosure.
Figure 14:
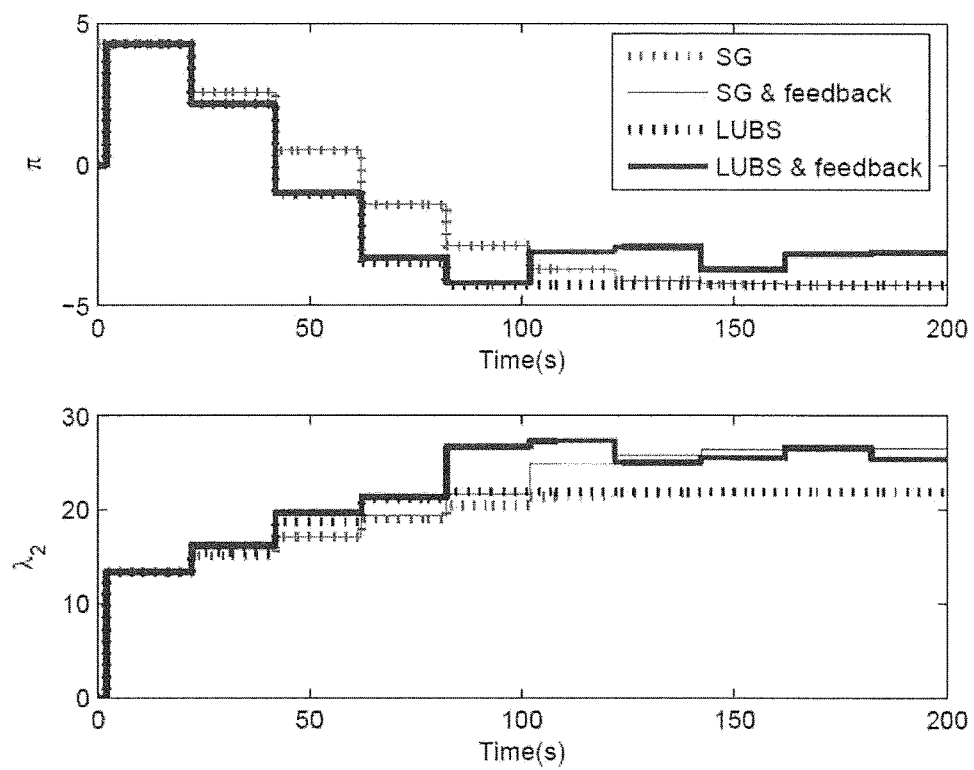
FIG. 14 illustrates graphs of a virtual tie-line power flow and a locational marginal price (LMP) of an area, according to various embodiments of the present disclosure.

FIG. 13 presents the comparison of four cases (SG, SG with frequency feedback, LUBS, LUBS with frequency feedback) on Gen 1's rotating speed. FIG. 14 presents the virtual tie-line power flow and Area 2 LMP. It can be seen that with frequency measurement, the prices have been increased and the system frequency deviation at steady state has been reduced by approximately one third.

The various embodiments of the present disclosure relate to two multi-agent decision making architectures based on primal-dual distributed optimization. In some embodiments, the key technique employed is the formulation of a dual's dual problem. Following the problem formulation, two types of iterative procedures based on subgradient update and lower-bound and upper-bound switching were adopted. The resulting decision making architectures can maximally protect information. Among agents, the exchanged information was limited to non-physical variables. Convergence properties for the two strategies were analyzed. Further, the discrete decision making architectures was implemented in a dynamic simulation platform to check their impact on frequency response. The limitations of the disclosed strategies were identified as the lower than necessary power dispatch due to the omission of loss in strategy design. A countermeasure to include frequency deviation in price updates was disclosed and tested to show frequency response improvements.

Meshed Network Application

Embodiments of the present disclosure can be applied to a radial network or a meshed network that can be separated into multiple areas radially connected. However, it can be challenging to implement a solution for scenarios where areas are connected as a meshed network. In this section, we show a meshed network example and indicate that extra care needs to be taken.

Consider a three-area system connected through a network. Each area has a generator and a load. The DC OPF problem is as follows.

$$\min C_1(P_{g1}) + C_2(P_{g2}) + C_3(P_{g3}) \tag{19a}$$

$$s.t. \ \lambda_1 : P_{g1} = D_1 + P_{12} + P_{13} \tag{19b}$$

$$\lambda_2 : P_{g2} = D_2 - P_{12} + P_{23} \tag{19c}$$

$$\lambda_3 : P_{g3} = D_3 - P_{13} - P_{23} \tag{19d}$$

$$\underline{d} \leq \begin{bmatrix} P_{12} \\ P_{13} \\ P_{23} \end{bmatrix} = C \cdot \begin{bmatrix} P_{g1} - D_1 \\ P_{g2} - D_2 \end{bmatrix} \leq \overline{d} \tag{19e}$$

where $\underline{d}$ and $\overline{d}$ are the line lower limit and upper limit vectors, C is the power transfer shifting factor matrix. The element of C matrix (i-th row, j-th column) defines the influence of a power transfer (from Bus j to the reference bus) on the i-th line.

Figure 15:
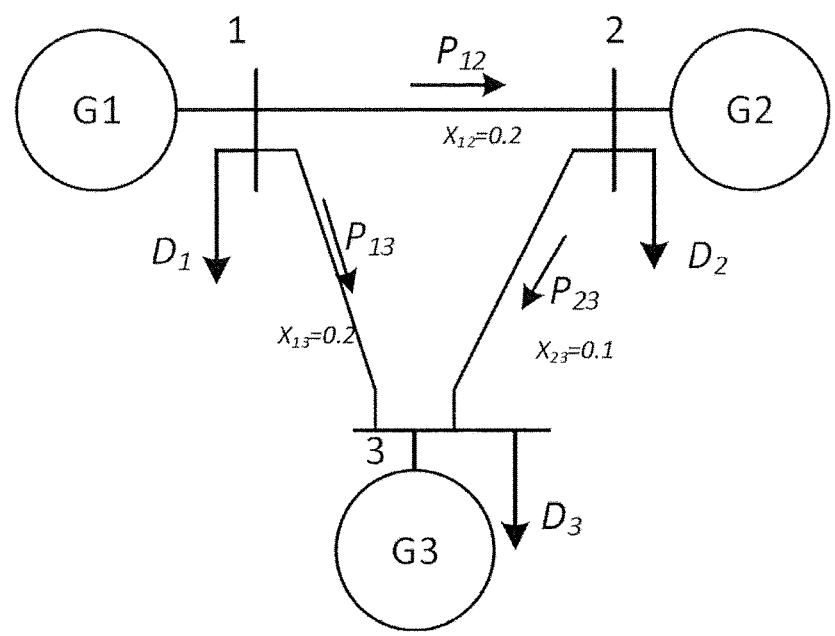
FIG. 15 illustrates a meshed network, according to various embodiments of the present disclosure.

FIG. 15 illustrates a meshed networked test system. For the test system shown in FIG. 15, the C matrix is as follows when Bus 3 is treated as a reference bus.

$$C = \begin{bmatrix} 0.4 & -0.2 \\ 0.6 & 0.2 \\ 0.4 & 0.8 \end{bmatrix} \tag{20}$$

Introduce the dual's dual formulation, we have:

$$\min_{P_{12}, P_{13}, P_{23}} \max_{\lambda_i} \min_{P_{gi}} C_1(P_{g1}) + \tag{21}$$

$$C_2(P_{g2}) + C_3(P_{g3}) + \lambda_1(D_1 + P_{12} + P_{13} - P_{g1}) +$$

$$\lambda_2(D_2 - P_{12} + P_{23} - P_{g2}) + \lambda_3(D_3 - P_{13} - P_{23} - P_{g3})$$

The above dual's dual optimization problem can be solved iteratively by applying the subgradient update method. Note the gradient of P12 can be found as $(\lambda_1 - \lambda_2)$. P12 is a primal variable. The iteration procedure is given as follows.

$$P_{12}^{k+1} = P_{12}^k - \alpha_1^k(\lambda_1^k - \lambda_2^k)$$

$$P_{13}^{k+1} = P_{13}^k - \alpha_2^k(\lambda_1^k - \lambda_3^k)$$

$$P_{23}^{k+1} = P_{23}^k - \alpha_3^k(\lambda_2^k - \lambda_3^k) \tag{22}$$

The dual's dual problem formulation has not taken into the network characteristic into consideration. The tie-line power flow vector has to be feasible for the network. For example, the following tie-line power flow vector [250,0,0]T MW is not feasible. Given this tie-line power flow vector, we can find the net power injection at each bus. The tie-line power flow vector is dependent on the net power injection (43e). The example is shown below.

$$\begin{bmatrix} P_1 \\ P_2 \\ P_3 \end{bmatrix} = \underbrace{\begin{bmatrix} 1 & 1 & 0 \\ -1 & 0 & 1 \\ 0 & -1 & -1 \end{bmatrix}}_{A} \begin{bmatrix} P_{12} \\ P_{13} \\ P_{23} \end{bmatrix} = \begin{bmatrix} 250 \\ 0 \\ -250 \end{bmatrix} \text{MW} \tag{23}$$

where $P_i$ is the i-th bus net power injection.

In the above equation, the net power from Bus 3 is included. This power can be excluded. Therefore, we have:

$$\begin{bmatrix} P_1 \\ P_2 \end{bmatrix} = \underbrace{\begin{bmatrix} 1 & 1 & 0 \\ -1 & 0 & 1 \end{bmatrix}}_{A_1} \begin{bmatrix} P_{12} \\ P_{13} \\ P_{23} \end{bmatrix}. \tag{24}$$

Given the net power injection at each bus, we can find the tie-line power flow applying (43e).

$$\begin{bmatrix} P_{12} \\ P_{13} \\ P_{23} \end{bmatrix} = C \begin{bmatrix} P_1 \\ P_2 \end{bmatrix} = C \cdot A_1 \begin{bmatrix} P_{12} \\ P_{13} \\ P_{23} \end{bmatrix} = \begin{bmatrix} 100 \\ 150 \\ 100 \end{bmatrix} \text{MW} \tag{25}$$

Therefore, in order for the tie-line power flow vector to be feasible, a certain restriction has to be applied. Hereafter, we notate the tie-line power flower vector as π.

$$\pi = C \cdot A_1 \cdot \pi \tag{26}$$

Therefore, the tie-line power flow vector has to meet the above requirement to be feasible. For this particular example, we find the matrix$C^* A_1$ as $$C \cdot A_1 = \begin{bmatrix} 0.4 & -0.2 \\ 0.6 & 0.2 \\ 0.4 & 0.8 \end{bmatrix} \begin{bmatrix} 1 & 1 & 0 \\ -1 & 0 & 1 \end{bmatrix} = \begin{bmatrix} 0.6 & 0.4 & -0.2 \\ 0.4 & 0.6 & 0.2 \\ -0.4 & 0.4 & 0.8 \end{bmatrix}.$$

The above matrix has a rank of 2 and three eigenvalues as 1,1,0. Re-examining (26), we find that in order to be feasible towards the network characteristic, π should be an eigenvector of CA1. This eigenvector is related to eigenvalue of 1. For this case, there are two sets of vectors that are related to eigenvalue 1. The two sets are:

$$\pi = k \begin{bmatrix} 0.7276 \\ 0.4851 \\ -0.4851 \end{bmatrix} \text{ or } \pi = k \begin{bmatrix} 0.1173 \\ 0.5355 \\ 0.8364 \end{bmatrix} \quad (27)$$

Due to the feasibility requirement (27), the step size $\alpha_i$ in the update procedure (22) has to be selected with care. Multiplying $CA_1 - I$ at the left and right of (22), we have $$(CA_1 - I) \begin{bmatrix} \alpha_1^k (\lambda_1^k - \lambda_2^k) \\ \alpha_2^k (\lambda_1^k - \lambda_3^k) \\ \alpha_3^k (\lambda_2^k - \lambda_3^k) \end{bmatrix} = 0 \quad (28)$$

Therefore, for meshed network topology, additional requirements are posed for step size. Extra care is to be taken. Due to the difficulty of the updating method based on tie-line flow. An alternative method is provided. Consider the DC OPF formulation as follows.

$$\min_{P_{gi}} C_1(P_{g1}) + C_2(P_{g2}) + C_3(P_{g3}) \quad (29)$$

$$\text{subject to } \underbrace{\begin{bmatrix} P_{g1} \\ P_{g2} \\ P_{g3} \end{bmatrix}}_{P_g} - \underbrace{\begin{bmatrix} D_1 \\ D_2 \\ D_3 \end{bmatrix}}_{D} = - \underbrace{\begin{bmatrix} -10 & 5 & 5 \\ 5 & -15 & 10 \\ 5 & 10 & -15 \end{bmatrix}}_{B} \underbrace{\begin{bmatrix} \theta_1 \\ \theta_2 \\ \theta_3 \end{bmatrix}}_{\theta}$$

$$\underline{d} \leq K\theta \leq \overline{d} \quad (30)$$

where K is a coefficient matrix and $K\theta$ is the tie-line power flow vector. The dual problem is expressed as follows.

$$\max_{\lambda} \min_{P_{gi}} \sum_i C_i(P_{gi}) + \lambda^T (P_g - D + B\theta) \quad (31)$$

$$\underline{d} \leq K\theta \leq \overline{d}$$

where $\lambda$ is the vector of dual variables associated with $P_g - D = B\theta$. If $\theta$ can be treated in an additional layer similar as the tie-line flow, the above problem becomes:

$$\min_{\theta} \max_{\lambda} \min_{P_{gi}} \sum_i C_i(P_{gi}) + \lambda^T (-P_g + D - B\theta) \quad (32)$$

$$\underline{d} \leq K\theta \leq \overline{d}$$

The gradient for the phase angle vector $\theta$ is $-B^T \lambda$. Since B is a symmetric matrix, the gradient is $-B\lambda$. The $\theta$ based iterative procedure can be summarized as:

Step 1: Given a vector of $\theta^k$ at k-step, find out the net injection at each bus $P_{kni}$,
where $P_n = -B\theta^k$.
Step 2: For each area, carry out OPF solving by treating the net injection to the grid $P^k_{ni}$ as a load. For each area, the following optimization problem is to be solved.

$$\max_{\lambda_i} \min_{P_{gi}} C_i(P_{gi}) + \lambda_i(-P_{gi} + D_i + P^k_{ni}) \quad (33)$$

Figure 16:
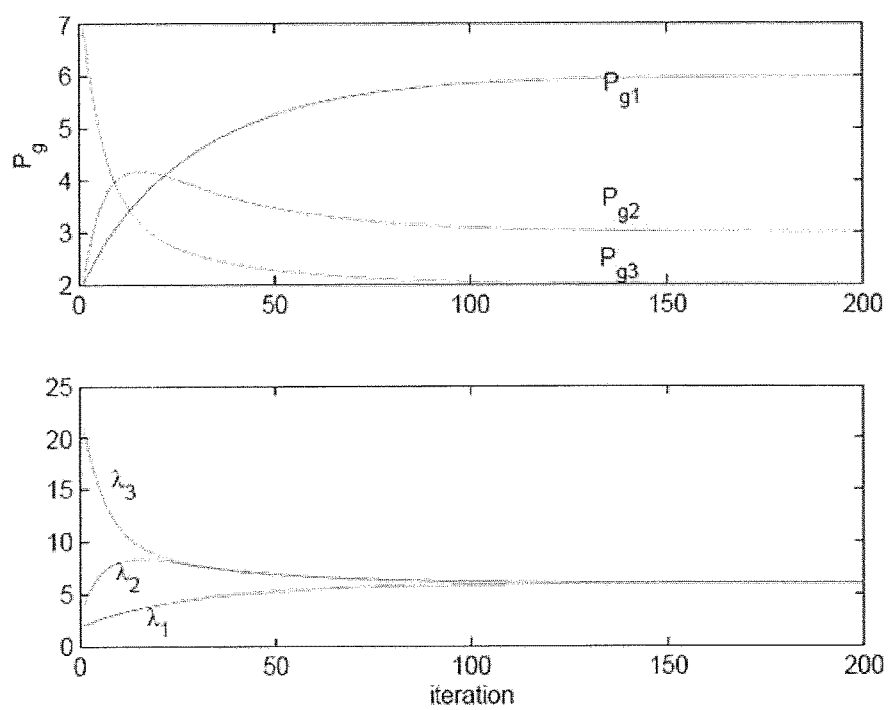
FIG. 16 illustrates graphs of generator power and prices at each bus using a dual's dual method, according to various embodiments of the present disclosure.

The price $\lambda^k_i$ at every bus will be found.
Step 3: Update: $\theta^{k+1} = \theta^k - \alpha B\lambda^k$, where $\alpha$ is the step size. We also conducted a numerical test for a three-bus system and the results over iterations are shown in FIG. 16. The case study results show that the three prices converge when the line limits are not considered. For a step size $\alpha = 0.0001$, the algorithm converges in less than 200 iterations.

Next, a comparison with ADMM is described. The above DCOPF problem for the meshed network is also solved by ADMM. The type of consensus ADMM with a global variable z is implemented. For each area, $\theta^i = z^k$ is a constraint. The updating procedure for z, Pgi and $\lambda$i are given as follows. Note that $\lambda$i is the dual variable vector related to $\theta^i = z^k$ constraint. It is not the same as the LMP price vector.

$$P^k_{gi}, \theta^{i,k+1} = \text{argmin}$$

$$\left\{ C_i(P_{gi}) + (\lambda_i^k)^T (\theta^i - z^k) + \frac{\rho}{2} \|\theta^i - z^k\|^2 \text{ s.t. (17b) or (17c) or (17d)} \right\}$$

$$z^{k+1} = \frac{1}{3} \sum P^{k+1}_{gi}$$

$$\lambda_i^{k+1} = \lambda_i^k + \rho(\theta^{i,k+1} - z^{k+1})$$

Figure 17:
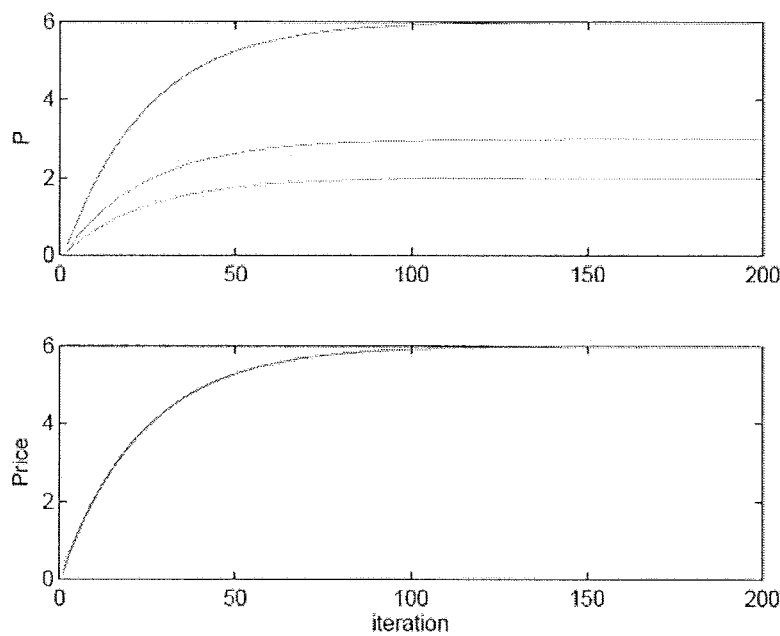
FIG. 17 illustrates graphs of generator power and prices at each bus using a ADMM method, according to various embodiments of the present disclosure.

FIG. 17 gives the iterative results for ADMM method. Note that the dual's dual method and ADMM method can achieve comparable convergence for this DCOPF problem. To adopt ADMM, each area's objective function has to be modified.

Next, two additional case studies are discussed. The first case study is to find the approximate AC OPF solution of an IEEE 14-bus system using the proposed multi-agent solving method. The second case study shows how to implement an iterative decision making procedure in a more realistic platform. The procedure is implemented in a dynamic simulation platform in Power System Toolbox (PST) for a two-area four-machine system.

Multi-Agent AC OPF

Figure 18:
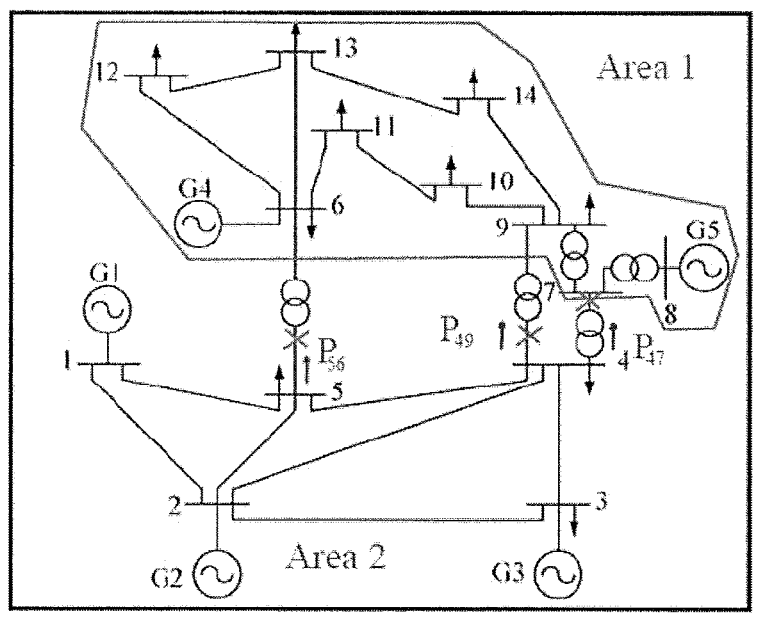
FIG. 18 illustrates a drawing of an IEEE 14-bus system, according to various embodiments of the present disclosure.

The system in FIG. 18 is separated into two areas if the tie-lines Line 56, Line 47 and Line 49 are open. The original system has Bus 1 designated as the slack bus. For the two islanded systems, Bus 1 and Bus 6 are designated as the slack buses for each area respectively. Since these three branches are for transformers modeled as reactance only, the line flows at the sending end and the receiving end are exactly the same. The reactive power flows are approximated to be zero. This approximation will result in discrepancy between the embodiments of the present disclosure and the solution from AC OPF.

Area 1 consists of two generators at bus 6 and bus 8 and loads on the following buses: 11, 12, 13, 14, 10, 6, 7, and 9. In addition, the existing loads at buses 6,7,9 will be modified to include the line flow injections from P56, P47, and P49 respectively. The reactive power injections due to the three tie-lines are assumed to be zero. Similarly, for Area 2, the tie-line flows are also reflected in load modification. AC OPF can then be carried out for Area 1 and Area 2. MATPOWEPv is used for this research to carry out AC OPF calibration at each step. The AC OPF formulation can be found in a MATPOWER manual, with generator power output, voltage magnitudes and phase angles included in decision variables, generator capacity, line flow limits, and voltage magnitude limits considered. The LMPs at the boundary buses (4, 5, 6, 7, 9) are exchanged between the two areas to update the line flows. With updated line flows, the two areas again carry out AC OPF until the line flows converge or limits are hit.

Figure 19:
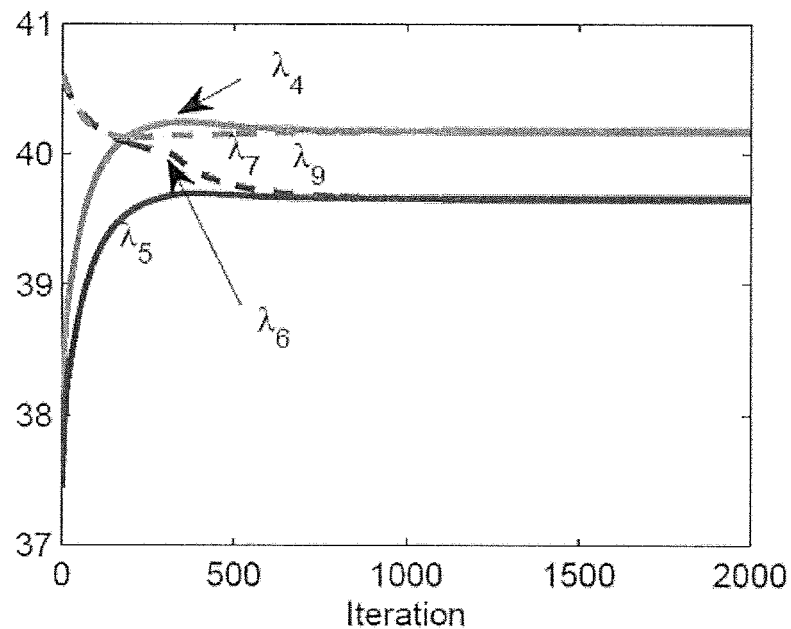
FIG. 19 illustrates a graph of boundary bus prices, according to various embodiments of the present disclosure.
Figure 20:
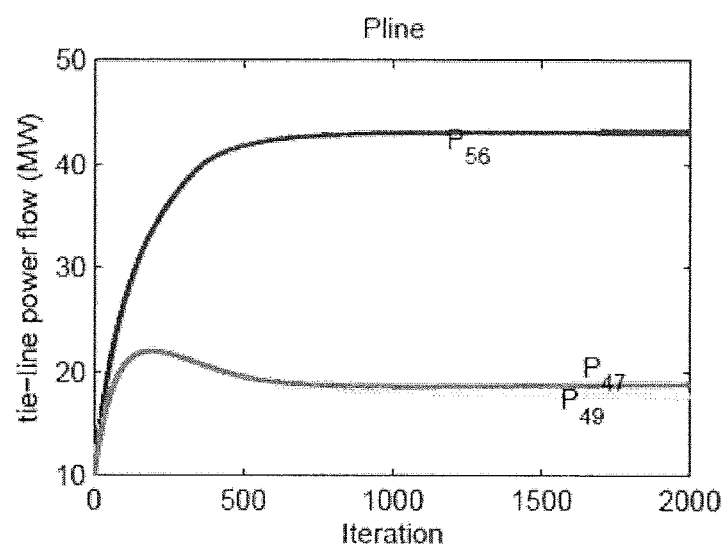
FIG. 20 illustrates a graph of tie-line power flow, according to various embodiments of the present disclosure.

FIG. 19 presents the boundary bus prices. The step size is chosen as 0.1 for each iteration. It can be observed that the prices at Bus 5 and Bus 6 will eventually be the same while the prices at Bus 4, Bus 7 and Bus 9 are also the same. FIG. 20 presents the tie-line power flows with a step size of 0.1. The flows are observed to achieve constant values after an initial adjustment.

The solutions using the embodiments of the present disclosure are compared with conventional AC OPF solutions from MATPOWER. Table I gives the comparison on generator power dispatch and tie-line flows. It is observed that the real-power dispatch levels for the five generators are close with less than 1.5% error. The individual tie-line real-power flows have 26% discrepancy due to the omission of reactive power injection in the proposed method. However, the total tie-line power flow has only 0.12% error.

TABLE I

COMPARISON OF POWER DISPATCH AND POWER FLOW

|  | Centralized AC OPF | | Proposed Method | | error (%) |
|---|---|---|---|---|---|
|  | P (MW) | Q (Mvar) | P (MW) | Q (MVar) | in P |
| G1 | 194.3302 | 0.0008 | 194.3333 | 0.0049 | 0.0016 |
| G2 | 36.7192 | 23.6850 | 36.7162 | 12.6079 | 0.0082 |
| G3 | 28.7426 | 24.1269 | 28.5841 | 22.6538 | 0.5514 |
| G4 | 0.0003 | 11.5455 | 0.0004 | 20.3407 | — |
| G5 | 8.4949 | 8.2730 | 8.5857 | 4.8770 | 1.0689 |
| Line56 | 42.0553 | 15.1379 | 43.1045 | 0 | 2.4948 |
| Line47 | 22.8471 | −3.9936 | 17.7270 | 0 | 22.4103 |
| Line49 | 14.8406 | 1.1668 | 18.8173 | 0 | 26.7961 |
| Total | 79.743 | 12.3111 | 79.6488 | 0 | 0.1181 |

Further, the LMPs of each bus are listed in Table II. The greatest error is for Bus 6 at 0.19%. Therefore, overall, the proposed method can provide a very close approximation of the optimal power flow solution.

TABLE II

COMPARISON OF LMP ($/MW$_H$).

|  | Centralized OPF | Proposed method | error (%) |
|---|---|---|---|
| Bus 1 | 36.7238 | 36.7240 | 0.0005 |
| Bus 2 | 38.3596 | 38.3581 | 0.0039 |
| Bus 3 | 40.5749 | 40.5717 | 0.0079 |
| Bus 4 | 40.1902 | 40.1754 | 0.0368 |
| Bus 5 | 39.6608 | 39.6561 | 0.0119 |
| Bus 6 | 39.7337 | 39.6561 | 0.1953 |
| Bus 7 | 40.1715 | 40.1727 | 0.0030 |
| Bus 8 | 40.1699 | 40.1717 | 0.0045 |
| Bus 9 | 40.1662 | 40.1780 | 0.0294 |
| Bus 10 | 40.3178 | 40.3156 | 0.0055 |
| Bus 11 | 40.1554 | 40.1191 | 0.0904 |
| Bus 12 | 40.3791 | 40.3028 | 0.1890 |
| Bus 13 | 40.5755 | 40.5111 | 0.1587 |
| Bus 14 | 41.1975 | 41.1713 | 0.0636 |

Figure 21:
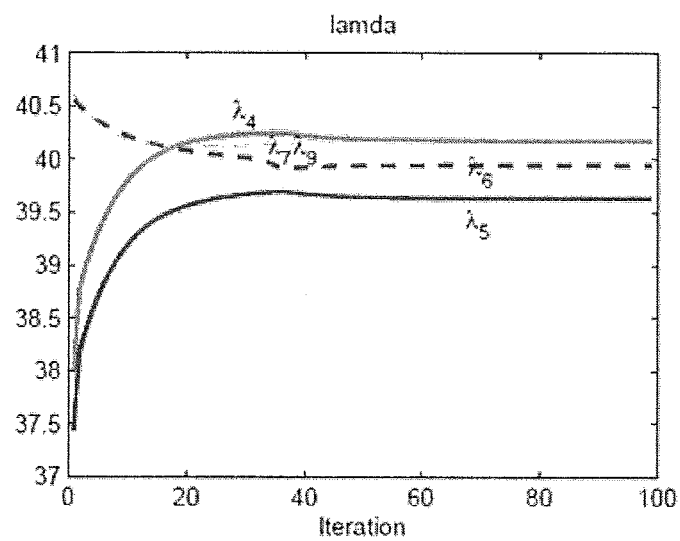
FIG. 21 illustrates another graph of tie-line power flow, according to various embodiments of the present disclosure.
Figure 22:
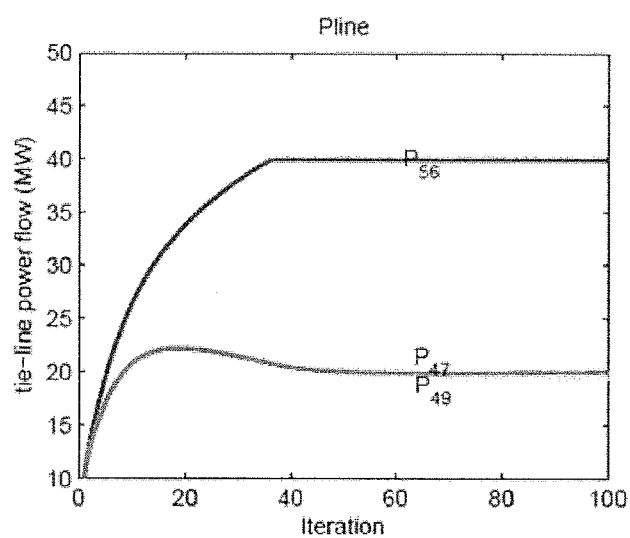
FIG. 22 illustrates another graph of tie-line power flow, according to various embodiments of the present disclosure.

In the next study, the transformer in Line56 is assumed to have limited capacity of 40 MW. The iterative solutions of the embodiments of the present disclosure are presented in FIG. 21 and FIG. 22. It is observed that when the line limit is hit, the LMPs at Bus 5 and Bus 6 are no longer the same. Embodiments of the present disclosure can take care of tie-line limits.

Dynamic Simulation Platform Implementation and Frequency Response Demonstration

The discrete decision making architectures will be implemented into a dynamic simulation platform to examine their impact on system frequency response. Power System Toolbox is selected as the dynamic simulation platform. The classic two-area four-machine power system is modified slightly to have shortened tie-lines and well-damped electromechanical dynamics. Generators are modeled as classical generators with turbine-governor blocks. Primary frequency droops with the regulation constant at 4% are all included.

The power system and its privacy-preserving decision making architecture have been illustrated in FIG. 6. The discrete decision making will take place every 5 seconds. The power commands from Agent 1 and Agent 2 will be sent to change the turbine-governors' power reference inputs. Among the two agents, the information exchanged includes the tie-line power flow command and the price signal. Area 1 consists of Gen 1 and Gen 2 and Load 1. Area 2 consists of Gen 3, Gen 4 and Load 2. The two areas are connected through tie-lines. Initially, the four generators are dispatched at 6.8776 pu, 7.00 pu, 7.16 pu and 7.00 pu. Assume that in Area 1 the two generators are having the same quadratic cost functions: 1.5P12, 1.5P22 and in Area 2 the two generators are also having the same quadratic cost functions P32 and P42. The total load is 27.41 pu. If the tie-line transfer limit is very high, then the LMPs at two areas are the same when tie-line power loss is ignored. In addition, if the generators' limits are ignored, then LMP equals marginal cost of each generator.

Initially the four generators' dispatch levels are similar. After the decision making procedures, Area 2's generators will have higher dispatch levels as Gen 3 and Gen 4 are much cheaper than Gen 1 and Gen 2. The economic dispatch problem is expressed in (34).

$$\min 1.5P_{g1}^2 + 1.5P_{g2}^2 + P_{g3}^2 + P_{g4}^2 \qquad (34)$$

$$\text{s.t.} \sum_i P_{gi} = 27.41$$

where $P_{gi}$ is the power dispatch level of ith generator.

The economic dispatch pattern for the four generators from the optimization problem is: 548.2 MW, 548.2 MW, 822.3 MW, and 822.3 MW. The tie-line flow should be 102 MW or 1.02 pu.

As one non-limiting example, at every 5 seconds, Area 1 will send Area 2 the tie-line flow command and Area 2 sends Area 1 its LMP λ2. The two areas also compute LMPs and dispatch patterns based on the tie-line flow command π. Area 1 updates the tie-line flow command π based on the two LMPs. At the next time interval, Area 1 sends out the updated tie-line flow command.

When implemented into dynamic simulation, the discrete change for every step should not be too large. This can be achieved by selecting a varying α in the π updating procedure. In the first few steps, α can be small and increased when the price difference becomes smaller.

Figure 23:
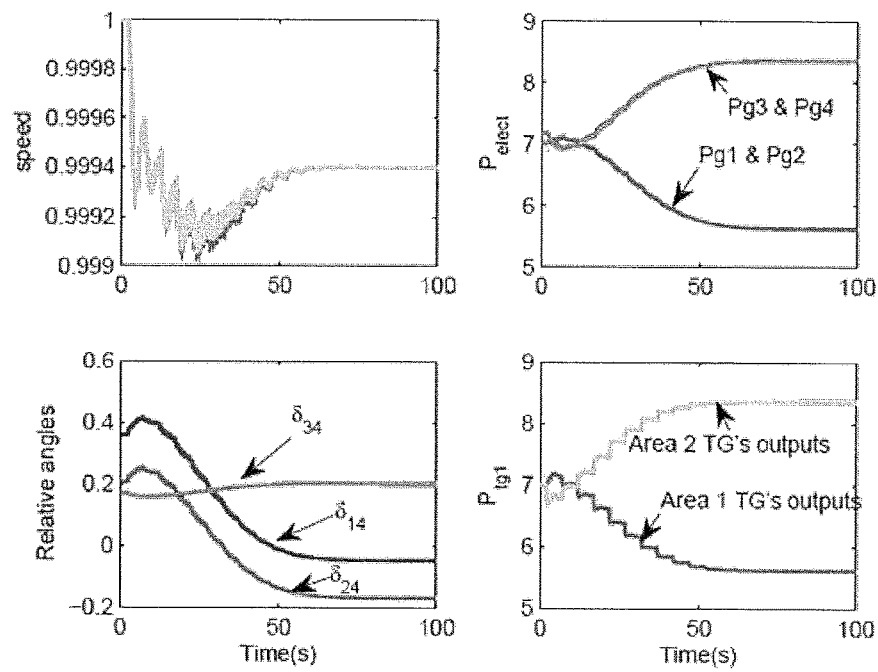
FIG. 23 illustrates graphs of system dynamic response, according to various embodiments of the present disclosure.

The dynamic responses of the system are presented in FIG. 23. It can be seen that within 100 seconds, the system achieves a new steady-state. The power dispatch levels of the generators are all changed to new levels. The system has a frequency deviation of −0.0006 pu. This is due to the assumption of a lossless line developing the decision making strategy. The power dispatched by the generators only takes care of loads. The total generation is less than the total consumption including loads and tie-line power loss. Therefore, the steady-state frequency is below the nominal frequency.

Table III lists the generator dispatch levels at 100 second. These values are compared with the solutions from the ideal economic dispatch problem in (34). It has been found that the generator dispatch levels are all higher than the optimal values from economic dispatch (0.135 pu). This discrepancy is due to the droop control. For the four 900 MW generators, each is equipped with a droop frequency controller with the droop parameter R at 0.04 pu. Therefore, for a −0.0006 pu frequency variation, the turbine governors should provide additional power ($\Delta$Pgi, where $$\Delta P_{gi} = -\frac{1}{R}\Delta f\bigg).$$

In this case, $$\Delta P_{gi} = \frac{1}{0.04} \times 0.0006$$

pu based on the generators' power base (900 MW) and $\Delta$Pgi=0.135 pu based on the system base (100 MW).

TABLE III

GENERATOR DISPATCH LEVELS

|  | Dynamic Simulation | Economic Dispatch |
|---|---|---|
| $P_{g1}$ | 5.62 pu | 5.482 pu |
| $P_{g2}$ | 5.62 pu | 5.482 pu |
| $P_{g3}$ | 8.36 pu | 8.223 pu |
| $P_{g4}$ | 8.36 pu | 8.223 pu |

Figure 24:
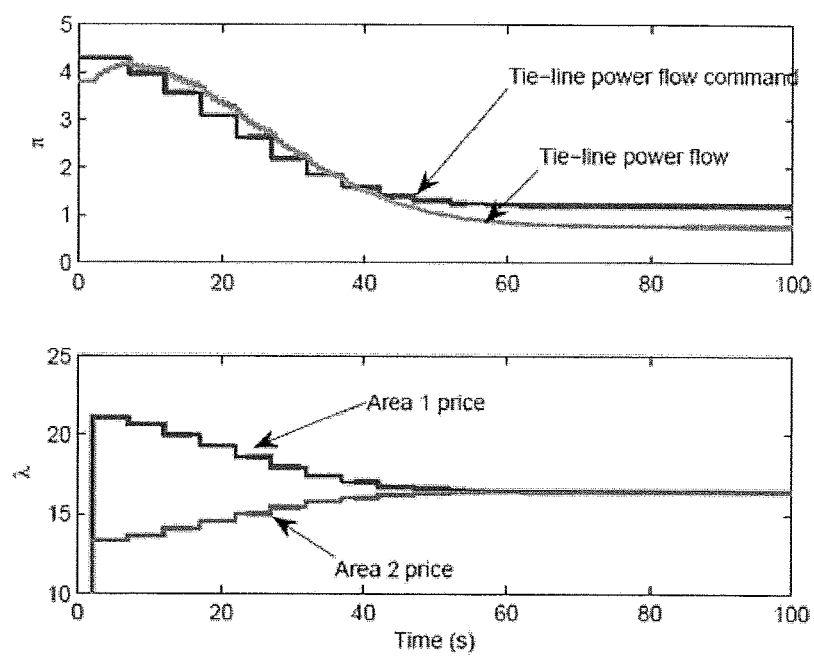
FIG. 24 illustrates graphs of the Lagrangian mutlipler, according to various embodiments of the present disclosure.

The discrete decision variables are also recorded for every simulation step and presented in FIG. 24. It can be found that in ten steps, both c and LMPs converge to constant values. The tie-line flow command and the tie-line power flow from dynamic simulation are plotted against each other. The two are different due to power system dynamics and the loss in the network. Initially, all generators are dispatched at the same level, therefore, generators in Area 1 incur higher marginal cost. Area 1's LMP is much higher than Area 2's LMP. Therefore, based on the updating mechanism, the tie-line power flow command from Area 1 to Area 2 should decrease. In turn, Area 1's generators should dispatch less while Area 2's generators should dispatch more power. The dynamic simulation results reasonably reflect the system behavior during its decision making process.

The various embodiments of the present disclosure relate to a novel multi-agent decision making architecture that is designed based on dual's dual problem formulation. The subgradient updating solving procedure renders an architecture that is easier to implement that existing solution. The present disclosure of the various embodiments includes an investigation of the convergence property of the algorithm and applicability in meshed networks. Case studies demonstrate the ability of multi-agent AC OPF solving procedure. Further, the present disclosure of the embodiments is the first of its kind to introduce a dual's dual problem formulation in AC OPF solving. The embodiments provide a close approximation to AC OPF solutions. Further, the discrete decision making architectures are implemented in a dynamic simulation platform to illustrate the architecture setup in a real-world scenario.

Figure 25:
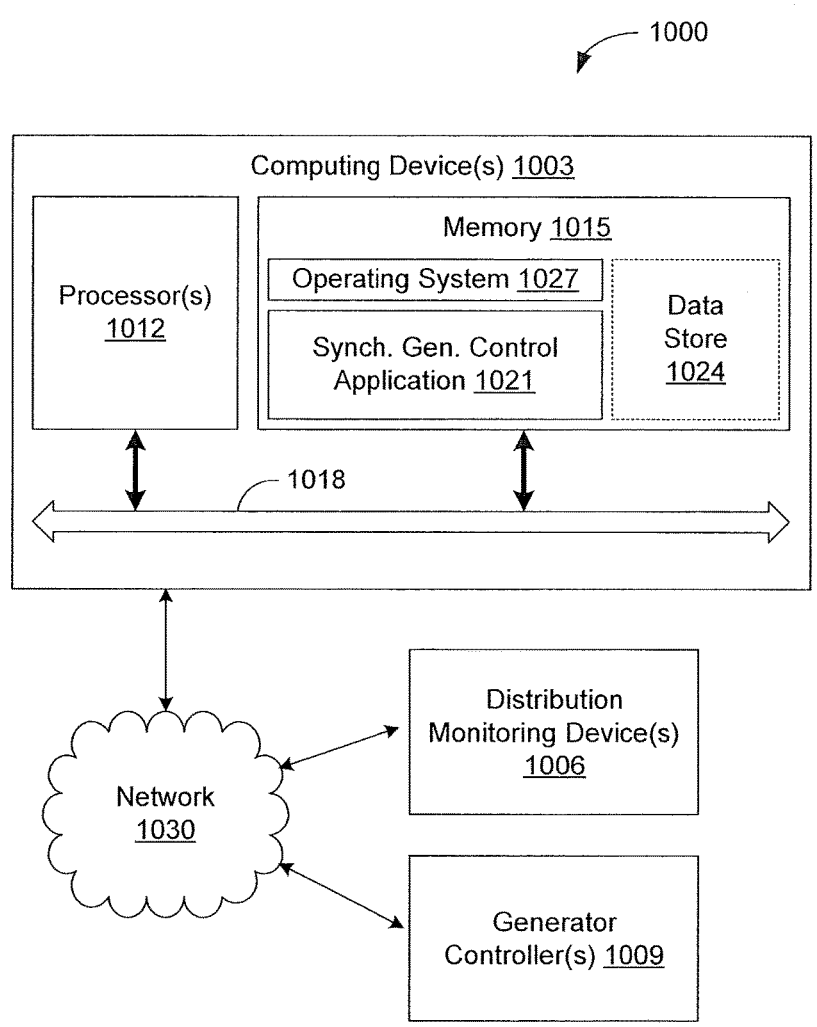
FIG. 25 is an example of a system that may be utilized in power distribution analysis and control, according to various embodiments of the present disclosure.

Referring now to FIG. 25, shown is an example of a system 1000 that may be utilized in the monitoring and control of power systems. The system 1000 includes one or more computing device(s) 1003, one or more distribution monitoring device(s) 1006 (e.g., a Phasor measurement unit) that can be distributed about a power distribution network to provide indications of operational conditions in the power distribution network, and one or more generator controller(s) 1009 associated with generators distributed throughout the power distribution network. For example, the distribution monitoring device(s) 1006 can monitor electrical power distribution by monitoring conditions of components of the distribution network such as generators and/or distribution buses. Monitored conditions can include voltage levels, current flows, frequencies, operating speeds, and/or other conditions of the various system components. The generator controller(s) 1009 can control the operation of the corresponding generator(s) based upon signals received from the computing device 1003. For example, the computing device can communicate estimated parameters of the synchronous generator model of FIG. 1 to the generator controller 1009 for updating and use in control of the corresponding generator.

The computing device 1003 includes at least one processor circuit, for example, having a processor 1012 and a memory 1015, both of which are coupled to a local interface 1018. To this end, the computing device(s) 1003 may comprise, for example, a server computer or any other system providing computing capability. The computing device(s) 1003 may include, for example, one or more display devices such as cathode ray tubes (CRTs), liquid crystal display (LCD) screens, gas plasma-based flat panel displays, LCD projectors, or other types of display devices, etc. The computing device(s) 1003 may also include, for example various peripheral devices. In particular, the peripheral devices may include input devices such as, for example, a keyboard, keypad, touch pad, touch screen, microphone, scanner, mouse, joystick, or one or more push buttons, etc. Even though the computing device 1003 is referred to in the singular, it is understood that a plurality of computing devices 1003 may be employed in the various arrangements as described above. The local interface 1018 may comprise, for example, a data bus with an accompanying address/control bus or other bus structure as can be appreciated.

Stored in the memory 1015 are both data and several components that are executable by the processor 1012. In particular, stored in the memory 1015 and executable by the processor 1012 include a synchronous generator control application 1021 and potentially other applications. Also stored in the memory 1015 may be a data store 1024 and other data. The data stored in the data store 1024, for example, is associated with the operation of the various applications and/or functional entities described below. For example, the data store may include Phasor measurement units (PMU) data, sample analysis results, parameter estimations, and other data or information as can be understood. In addition, an operating system 1027 may be stored in the memory 1015 and executable by the processor 1012. The data store 1024 may be may be located in a single computing device or may be dispersed among many different devices.

The distribution monitoring device 1006 is representative of a plurality of devices such as, e.g., PMUs that may be communicatively coupled to the computing device 1003 through a network 1030 such as, e.g., the Internet, intranets, extranets, wide area networks (WANs), local area networks (LANs), wired networks, wireless networks, networks configured for communication over a power grid, or other suitable networks, etc., or any combination of two or more such networks. The distribution monitoring device 1006 may comprise, for example, a processor-based system such as a computer system or other application specific monitoring system with communication capabilities. In some embodiments, a distribution monitoring device 1006 may be directly connected to the computing device 1003.

The components executed on the computing device 1003 include, for example, the synchronous generator control application 1021 and other systems, applications, services, processes, engines, or functionality not discussed in detail herein. The computing device 1003 can receive information regarding the monitored system from a distribution monitoring device 1006, which can then be evaluated by the synchronous generator control application 1021. The computing device 1003 may also receive stored information regarding a power distribution network for modeling and evaluation of the generator with frequency control.

It is understood that there may be other applications that are stored in the memory 1015 and are executable by the processor 1012 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 1015 and are executable by the processor 1012. In this respect, the term "executable" means a program file that is in a form that can ultimately be run by the processor 1012. Examples of executable programs may be, for example, a compiled program that can be translated into machine instructions in a format that can be loaded into a random access portion of the memory 1015 and run by the processor 1012, source code that may be expressed in proper format such as object code that is capable of being loaded into a random access portion of the memory 1015 and executed by the processor 1012, or source code that may be interpreted by another executable program to generate instructions in a random access portion of the memory 1015 to be executed by the processor 1012, etc. An executable program may be stored in any portion or component of the memory 1015 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Also, the processor 1012 may represent multiple processors 1012 and the memory 1015 may represent multiple memories 1015 that operate in parallel processing circuits, respectively. In such a case, the local interface 1018 may be an appropriate network that facilitates communication between any two of the multiple processors 1012, between any processor 1012 and any of the memories 1015, or between any two of the memories 1015, etc. The local interface 1018 may comprise additional systems designed to coordinate this communication, including, for example, performing load balancing. The processor 1012 may be of electrical or of some other available construction.

Although the synchronous generator control application 1021, and other various systems described herein, may be embodied in software or instructions executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Any logic or application described herein, including the synchronous generator control application 1021, that comprises software or instructions can be embodied in any non-transitory computer-readable medium for use by or in connection with an instruction execution system such as, for example, a processor 1012 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt %/o to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for optimizing alternating current (AC) power flow of a plurality of power systems, comprising:
   transmitting, by a computing device, a tie-line power flow command associated with a first bus of a power system to a remote power system, the computing device being associated with the power system, wherein the power system and the remote power system are connected via a tie-line, and the remote power system is associated with one or more remote generators, the power system having a first price associated with the first bus of the power system;
   obtaining, by the computing device, from the remote power system a second price associated with a second bus of the remote power system;
   adjusting, by the computing device, an AC tie-line power flow for one or more generators associated with the power system based at least in part on the tie-line power flow command from a previous time step, the first price, and the second price;
   determining, by the computing device, power outputs of the one or more generators based at least in part upon the AC tie-line power flow, determining the power outputs of the one or more generators comprises determining a power reference input of a turbine governor of the one or more generators;
   determining, by the computing device, the first price based at least in part upon the AC tie-line power flow associated with the power system; and
   transmitting, by the computing device, an updated power flow command to the remote power system based at least in part on the first price and the second price.

2. The method of claim 1, wherein determining the first price is further based at least in part on a primal-dual decomposition calculation.

3. The method of claim 2, wherein the primal-dual decomposition calculation is based at least in part on a subgradient update of the AC tie-line power flow.

4. The method of claim 2, wherein the primal-dual decomposition calculation is based at least in part on a lower-bound and upper-bound switching update of the AC tie-line power flow.

5. The method claim 1, wherein adjusting the AC tie-line power flow based on the first price and the second price further comprises determining a subgradient of the AC power flow.

6. The method of claim 1, wherein determining the first price is further based at least in part on a frequency difference associated with the one or more generators of the power system.

7. The method of claim 1, wherein the AC tie-line power flow comprises a first AC tie-line power flow, and further comprising receiving, by the computing device, an indication of an adjustment of a second AC tie-line power flow from the remote power system.

8. The method of claim 1, wherein the AC tie-line power flow represents an import AC tie-line power flow or an export AC tie-line power flow.

9. The method of claim 1, wherein the first price is a locational marginal price.

10. The method of claim 1, wherein the adjustment of the AC tie-line power flow for the one or more generators associated with the power system occurs at a periodic interval.

11. A power system, comprising:
    at least two generators that are coupled to a load, wherein the at least two generators are connected to a remote power system via a tie-line, the remote power system being associated with at least two remote generators;
    a computing device coupled to the at least two generators, the computing device being configured to at least:
    transmit a tie-line power flow command to the remote power system, the tie-line power flow command being associated with a power bus of the power system, and the power bus being associated with a price;
    obtain a remote price associated with a remote power bus of the remote power system;
    adjust an AC tie-line power flow for the at least two generators associated with the power system based at least in part on the tie-line power flow command from a previous time step, the price, and the remote price;
    determine a power output of at least one of the at least two generators based at least in part upon the AC tie-line power flow, determining the power output of the at least two generators comprises determining a power reference input of a turbine governor of the at least two generators;
    determine the price associated with the power bus of the power system based at least in part upon the AC tie-line power flow associated with the power system and the remote power system; and
    transmit an updated power flow command to the remote power system based at least in part on the price and the remote price.

12. The power system of claim 11, wherein determining the price is further based at least in part on a primal-dual decomposition calculation.

13. The power system of claim 12, wherein the primal-dual decomposition calculation is based at least in part on a subgradient update of the AC tie-line power flow.

14. The power system of claim 12, wherein the primal-dual decomposition calculation is based at least in part on a lower-bound and upper-bound switching update of the AC tie-line power flow.

15. The power system of claim 11, wherein determining the price is further based at least in part on a frequency difference associated with the at least two generators of the power system.

16. An apparatus, comprising:
    a power generator that is associated with a power system, wherein the power system and a remote power system are connected via a tie-line; and
    a computing device coupled to the power generator, the computing device being configured to at least:
    transmit a tie-line power flow command associated with a first bus of the power system to the remote power system, the first bus being associated with a price;
    obtain a remote price associated with a remote power generator of the remote power system;
    adjust an AC tie-line power flow for the power generator associated with the power system based at least in part on the tie-line power flow command, the price, and the remote price;
    determine a power output of the power generator based at least in part upon the AC tie-line power flow and the remote price, the power system being connected to the remote power system;

determine the price associated with the power generator based at least in part upon the AC tie-line power flow associated with the power system; and transmit an updated power flow command to the remote power system based at least in part on the price and the remote price.

17. The apparatus of claim 16, wherein determining the price is further based at least in part on a primal-dual decomposition calculation.

18. The apparatus of claim 17, wherein the primal-dual decomposition calculation is based at least in part on a subgradient update of the AC tie-line power flow.

19. The apparatus of claim 17, wherein the primal-dual decomposition calculation is based at least in part on a lower-bound and upper-bound switching update of the AC tie-line power flow.

20. The apparatus of claim 16, wherein the adjustment of the AC tie-line power flow for the power generator associated with the power system occurs at a periodic interval.

* * * * *